United States Patent
Leppäjärvi et al.

(10) Patent No.: US 12,351,733 B2
(45) Date of Patent: Jul. 8, 2025

(54) FLEXIBLE AND FOLDABLE ABRASION RESISTANT PHOTOPATTERNABLE SILOXANE HARD COAT

(71) Applicant: Optitune Oy, Oulu (FI)

(72) Inventors: Tiina Leppäjärvi, Oulu (FI); Milja Hannu-Kuure, Oulu (FI); Jarkko Leivo, Oulu (FI); Rauna-Leena Kuvaja, Oulu (FI); Admir Hadzic, Oulu (FI); Henna Järvitalo, Oulu (FI); Graeme Gordon, Oulu (FI); Ari Kärkkäinen, Oulu (FI)

(73) Assignee: Optitune Oy, Oulu (FI)

( * ) Notice: Subject to any disclaimer, the term of this patent is extended or adjusted under 35 U.S.C. 154(b) by 1080 days.

(21) Appl. No.: 17/045,531

(22) PCT Filed: Apr. 8, 2019

(86) PCT No.: PCT/FI2019/050282
§ 371 (c)(1),
(2) Date: Oct. 6, 2020

(87) PCT Pub. No.: WO2019/193258
PCT Pub. Date: Oct. 10, 2019

(65) Prior Publication Data
US 2021/0087429 A1    Mar. 25, 2021

(30) Foreign Application Priority Data
Apr. 6, 2018  (FI) .................... 20185324

(51) Int. Cl.
C09D 183/06 (2006.01)
C08F 283/12 (2006.01)
(Continued)

(52) U.S. Cl.
CPC .......... *C09D 183/06* (2013.01); *C08F 283/12* (2013.01); *C08G 77/14* (2013.01);
(Continued)

(58) Field of Classification Search
CPC .................................................... C09D 183/06
(Continued)

(56) References Cited

U.S. PATENT DOCUMENTS 3,759,867 A * 9/1973 Merrill .................... C08L 83/04
524/588
4,024,306 A   5/1977 Takamizawa et al.
(Continued)

FOREIGN PATENT DOCUMENTS

CN    101307070 A    11/2008
CN    101372562 A    2/2009
(Continued)

OTHER PUBLICATIONS

Machine_English_translation_WO_2018043845_A1; Han, D.; et al.; Composition for Window Film and Flexible Window Film Formed Therefrom; Mar. 8, 2018; EPO; whole document (Year: 2023).*
(Continued)

*Primary Examiner* — Tahseen Khan
(74) *Attorney, Agent, or Firm* — Laine IP Oy

(57) ABSTRACT

A layered structure comprising a substrate layer; and a layer of a siloxane polymer on the substrate layer, the layered structure being capable of being bent about a mandrel having a radius of curvature without breaking. The layer of the siloxane polymer has a thickness of 1 to 50 μm, in particular about 5 to 20 μm, and it is obtained by depositing on the substrate a composition comprising at least three different silane monomers, including at least one bi-silane; at least one of the silane monomers having an active group
(Continued)

capable of achieving cross-linking to adjacent siloxane polymer; at least partially hydrolyzing the silane monomers to form siloxane polymer chains; and cross-linking the siloxane polymer chains so as to achieve a cross-linked siloxane polymer layer on the substrate.

20 Claims, 2 Drawing Sheets

(51) Int. Cl.
*C08G 77/14* (2006.01)
*C08G 77/20* (2006.01)
*C09D 133/08* (2006.01)
*G02B 1/14* (2015.01)

(52) U.S. Cl.
CPC ........... C08G 77/20 (2013.01); C09D 133/08 (2013.01); G02B 1/14 (2015.01)

(58) Field of Classification Search
USPC .......................................... 428/213
See application file for complete search history.

(56) References Cited

U.S. PATENT DOCUMENTS

| | | |
|---|---|---|
| 6,207,728 B1 | 3/2001 | Sekiguchi et al. |
| 2004/0062873 A1 | 4/2004 | Jung et al. |
| 2012/0034450 A1 | 2/2012 | Morita et al. |
| 2013/0331476 A1 | 12/2013 | Bae et al. |
| 2016/0297933 A1 | 10/2016 | Kuwana et al. |
| 2017/0240769 A1 | 8/2017 | Mori |
| 2018/0066159 A1 | 3/2018 | Kärkkäinen et al. |
| 2018/0277691 A1 † | 9/2018 | Karkkainen |

FOREIGN PATENT DOCUMENTS

| | | | |
|---|---|---|---|
| CN | 102294851 A | | 12/2011 |
| CN | 107636097 A | | 1/2018 |
| JP | 2006063244 A | | 3/2006 |
| JP | 2017008144 A | | 1/2017 |
| JP | 2017215585 A | | 12/2017 |
| JP | 2018-506617 A | † | 3/2018 |
| KR | 10-2017-0000065 A | † | 1/2017 |
| KR | 2017103393 A | | 9/2017 |
| KR | 10-2017-0128438 A | † | 11/2017 |
| WO | WO2016146895 A2 | | 9/2016 |
| WO | WO-2016146896 A1 * | | 9/2016 .............. C08G 77/06 |
| WO | WO-2016146897 A2 * | | 9/2016 ........... C08L 23/0853 |
| WO | WO-2018043845 A1 * | | 3/2018 ................ C08J 5/18 |

OTHER PUBLICATIONS

Grundwurmer et al: Sol-gel derived erosiom protection coatings against damage caused by liquid impact. Wear, Sep. 10, 2007, vol. 263, pp. 318-329.

Kapoor et al: Modification and characterisation of pre-hydrolysed silanes by acrylate utilizing sol-gel process. Progress in Organic Coatings, Feb. 27, 2016, vol. 94, pp. 124-130.

* cited by examiner
† cited by third party

FLEXIBLE AND FOLDABLE ABRASION RESISTANT PHOTOPATTERNABLE SILOXANE HARD COAT

FIELD

The present invention relates to siloxane polymer compositions. In particular, the invention relates to a hard coating composition including a siloxane polymer compositions which have suitable properties for use in a flexible and foldable electronic device. The invention also relates to synthesis, polymerization and cross-linking of such compositions for producing a flexible abrasion resistant siloxane hard coated article and using the same, and an photopatternable optical film including the flexible siloxane hard coating cured article.

BACKGROUND

Transparent plastics have been widely used as a core material in optical and transparent display industries. In particular, transparent plastics such as PET (polyethylene terephthalate), PI (polyimide), PC (polycarbonate) or PMMA (polymethyl methacrylate) have been applied in flexible electronics applications, including displays, optical lens, transparent boards, and automotive industries as a lightweight alternative to glass owing to the properties of high light transmittance and suitable refractive index. However, these plastics have the disadvantage of low abrasion resistance, because they have lower surface hardness than glass. In order to make up this disadvantage, it is an important issue to develop hard coating technology for improving the surface hardness and abrasion resistance of plastics. In many processing cases, also photopatternability will give a significant optional advantage in electronic devices, such as sensors. In addition to the above properties it is important to develop the hard coating the way that it has good optical characteristics as the finished coated article, preferably achieving the required optical performance (e.g. transmission and reflection characteristics, haze, optimized for very low iridescence, a* and b*) by using only single layer or in some cases double layer coating can be needed to reach the required functionality.

Hard coating materials are largely divided into organic, inorganic, and organic-inorganic hybrid materials. Organic materials such as acryl, urethane, and melamine have the advantages of organic materials such as flexibility and moldability, but they have low surface hardness. In contrast, silicon-based inorganic materials have the properties of high surface hardness and transparency, but they have low flexibility and moldability. Since hard coating technology requires the advantages of the both materials, organic-inorganic hybrid materials have attracted more attention than each of them. However, even though many studies have been actively made to integrate the benefits of both organic and inorganic materials into the hard coating technology, they are still unsatisfactory.

Of the conventional technologies, Japanese Patent Publication No. 2006-063244 discloses a resin composition for hard coat, which is composed of colloidal silica surface-treated with a silane coupling agent having a reactive (meth)acrylate group in the molecule, a monomer having one reactive (meth)acrylate group in the molecule or a polymer prepared by polymerization of the monomers, a bifunctional (meth)acrylate, a tri- or higher functional (meth)acrylate, a leveling agent, and a photopolymerization initiator. However, photoradical polymerization of acrylate is sensitive to oxygen, unlike polymerization of alicyclic epoxy group.

US Patent Publication No. 20120034450 discloses a surface protection film, which can be obtained by mixing an ionizing radiation curable resin, a matting agent, an ultraviolet ray absorbing agent, and inorganic fine particles subjected to hydrophobization treatment so as to prepare a resin, and then curing the resin. However, physical mixing of the ionizing radiation curable resin with the inorganic fine particles may decrease dispersibility and cause aggregation of the inorganic fine particles. Transmittance is also decreased due to light scattering at the interface between the resin and the inorganic fine particles. Therefore, it is not suitable for good optical quality protection films.

US Patent Application No. 20130331476 discloses a hard coating composition comprising an alicyclic epoxy group-containing siloxane resin, which has a weight average molecular weight in the range of 1000 to 4000 and a molecular weight distribution of PDI 1.05 to 1.4. Further, Japanese Patent Application JP2017008144 teaches a flexible epoxy group containing siloxane resins.

However, the afore-mentioned siloxane resins are difficult to process to flexible and foldable coatings that are also photopatternable.

Development of hard coating materials with easy processability of organic materials and high light transmittance and surface hardness of inorganic materials will be on interest for a wide range of applications of plastics. For flexible plastic substrate materials easy processability are essential in volume methods, such as roll-to-roll method. Photopatternability is important for example in novel flexible electronic devices, such as flexible sensors.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, in a first object, there is provided a layered structure which comprises a substrate layer; and an overlapping layer of a siloxane polymer, the layered structure being capable of being bent about a mandrel having a radius of curvature without breaking.

In particular, the present invention provides a layered structure which is capable of being bent about a mandrel having a radius of curvature without breaking, as evidenced as a value of less than 0.4 cm on an outfolding mandrel diameter test, and further having a surface hardness greater than 3H. Further, the present materials have excellent adhesion properties and scratch and abrasion resistance.

In a second object of the invention, a structure of the present kind can be obtained by depositing on a substrate a composition comprising at least three different silane monomers, including at least one bi-silane monomer. At least one of the silane monomers has an active group capable of achieving cross-linking to adjacent siloxane polymer. At least a part of the silane monomers are hydrolyzed to form siloxane polymer chains, and the siloxane polymer chains are at least partially cross-linked so as to achieve a cross-linked siloxane polymer layer on the substrate.

The present invention also comprises, in a third object of the invention, a method of producing a layered structure with a substrate layer and a layer of a siloxane polymer, which method comprises the steps of providing a substrate which is flexible or bendable or both; providing a composition comprising silane monomers; at least partially hydrolyzing and polymerizing the silane monomers to form siloxane polymer chains; depositing on the substrate said composition comprising said partially hydrolyzed and polymerized silane monomers; and cross-linking the siloxane polymer chains so as to achieve a cross-linked siloxane polymer layer on the substrate.

Further, in a fourth object, the present invention provides siloxane compositions comprising, dispersed or dissolved in a solvent,
- at least three different silane monomers, including at least one bi-silane, at least one of the silane monomers having an active group capable of achieving cross-linking to adjacent siloxane polymer;
said composition being capable of forming
- a layer having a thickness of 1 to 50 μm, in particular about 4 to 20 μm, which
- can be bent about a mandrel having a radius of curvature without breaking.

In a fifth object, the present invention provides a method of producing a siloxane polymer, comprising the steps of
(a) admixing first solvent(s), at least three different silane monomers, at least one of which is a bi-silane, to form a mixture, wherein at least one of the silane monomers includes an active group capable of achieving cross-linking to adjacent siloxane polymer chains upon a thermal or radiation initiation;
(b) subjecting the mixture to an acid treatment so that the silane monomers are at least partially hydrolysed, and the hydrolysed silane monomers, the silane monomers are at least partially polymerized and cross-linked;
(c) optionally changing the first solvent to a second solvent; and
(d) subjecting the mixture to conditions conducive to further cross-linking of the siloxane polymer.

The siloxane polymer thus obtained is typically capable of forming a layer having a thickness of 1 to 50 μm, in particular about 4 to 20 μm, which can be bent without breaking about a mandrel having a radius of curvature.

Further aspects of the present invention are disclosed in dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in depending claims are mutually freely combinable unless otherwise explicitly stated.

EMBODIMENTS

The present technology provides for layered structures wherein on a substrate layer is provided a layer of a siloxane polymer. The layered structure is "bendable" in the sense that it is capable of being bent about a mandrel, having a radius of curvature, without breaking.

Figure 2:
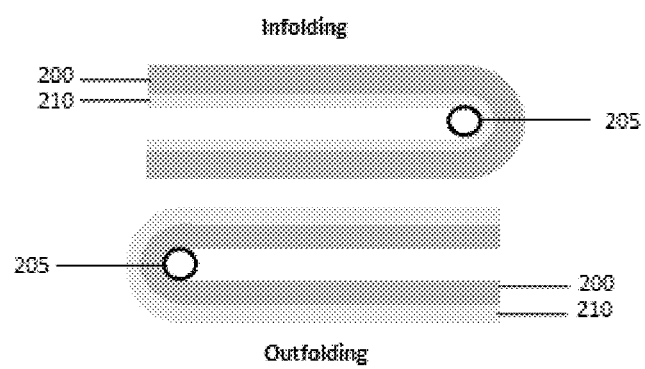
FIG. 2 shows the cross-section of a substrate 200 and material film 210 in-folding and out-folding arrangement around a mandrel 205.

As shown in FIG. 2, the properties of bendability can be tested using a test involving infolding or outfolding of the layered structure about a mandrel.

Typically, the bendable layer of the siloxane polymer has a thickness of 1 to 50 μm, in particular about 4 to 20 μm. The substrate has a thickness of about 10 to 250 μm, in particular 20 to 150 μm for example 25 to 125 μm.

Preferably, the substrate is bendable, such that it is capable of being bent about a mandrel having a first minimum radius of curvature without breaking. A layered structure of the present kind is in particular capable of being bent about a mandrel having a second minimum radius of curvature without breaking, said first minimum radius being smaller or equal to the second minimum radius of curvature.

For a siloxane polymer having a thickness in the range of about 1 to 50 μm, in particular 4 to 20 μm, for example about 5 to 10 μm, the infolding diameter is less than 0.2 cm. The outfolding diameter is less than 1 cm, in particular less than 0.8 cm, for example less than 0.6 cm or less than 0.5 cm or even less than 0.4 cm.

Thus, in one embodiment, the present siloxane polymer layer at a thickness of 1 to 50 μm, in particular 4 to 20 μm, for example about 5 to 10 μm, is capable of being bent about a mandrel having an outfolding radius of curvature of less than 0.5 cm, in particular less than 0.4 cm, for example less than 0.3 cm or less than 0.25 cm or even less than 0.2 cm, without breaking.

The ratio between the maximum radius of curvature to maximum layer thickness is in the range of 5000-20, in particular 1000-100, for example 400-150.

The siloxane material has excellent hardness. Typically, the hardness is greater than 3H, over 4H, over 5H, over 6H or even over 7H as determined by ASTM D3363-00, Elcometer tester.

Further, the siloxane materials have excellent adhesion properties, typically meeting the requirement of 4B-5B, as tested by ASTM D3359-09, Cross-Hatch tester.

The present siloxane materials also have excellent scratch resistance. As will appear from Table 2, on a Taber linear abrasion test (Using Linear Abraser from Taber Industries) carried out at up to 2000 linear cycles with BonStar steel wool #0000, at 500 g weight, 2×2 cm head size, 2.0 inch stroke length, 60 cycles/min, no scratches could be observed by visual inspection.

In one embodiment, the present siloxane materials exhibit in combination the following properties:
at a film thickness of 1 to 20 μm, as a layered structure,
  a capability of being bent about a mandrel having a radius of curvature without breaking, as evidenced as a value of less than 0.6 cm, in particular less than 0.4 cm, on an outfolding mandrel diameter test,
the surface of the siloxane layer
  having a surface hardness greater than 3H, as determined by ASTM D3363-00, Elcometer tester;
  an adhesion of 4B-5B, as tested by ASTM D3359-09, Cross-Hatch tester; and scratch resistance as evidenced by no visual scratches on a Taber linear abrasion test (Using Linear Abraser from Taber Industries) carried out at up to 2000 linear cycles with BonStar steel wool #0000, at 500 g weight, 2×2 cm head size, 2.0 inch stroke length, 60 cycles/min.

In preferred embodiments, the substrate layer is selected from the group of glass, quartz, silicon, silicon nitride, polymers, metals and plastics and combinations thereof.

The substrate can be an oxide, doped oxide, semimetal or the like.

In particular, the substrate is selected from thermoplastic polymers, such as polyolefins, polyesters, polyamides, polyimides, acrylic polymers, such as poly(methylmetharylate), and Custom Design polymers. A particular advantage of such substrates is that by means of the present technology, bendable layered structures can be achieved.

In structures according to preferred embodiments, an intermediate polymeric layer can be optionally provided on the substrate between the substrate and the siloxane polymer. Such an intermediate layer can have a thickness of 20 nm to 100 µm.

In preferred embodiments, the intermediate layer is capable of improving at least one of the following properties: mechanical adhesion of the siloxane polymer to the substrate, optical properties of the layered structure or both. Thus, typically, the intermediate layer can be a primer which improves attachment of the siloxane polymer to the substrate.

Examples of materials suitable for intermediate layers can be found in WO2016/146897 (cf. examples 16 to 29).

Thus, in one embodiment, the intermediate layer is formed from a composition obtained by combining a metal oxide precursor, such as a metal alkoxide, potentially together with a complexing agent for the metal precursor, with one or, preferably several silane monomers, and with an "acrylate" compound, such as an acrylate or methacrylate compound, which potentially can be a silane monomer. The silane monomers typically comprise silane monomers of any of formulas I to IV below. In particular, the silane monomers have two or three hydrolyzing groups, such as alkoxides (cf. compounds of formula V), and one or two non-hydrolyzing groups, such as alkyl groups containing 1 to 6 carbon atoms, or aryl groups, containing 1 to 3 aromatic carbon rings. In addition, the silane monomers can be bisilane compounds as defined in formula VI below. The metal is typically a transition metal, such as titanium, zirconium, tantalum, aluminum, or combinations thereof. The metal will in particular contribute to obtaining preselected optical properties, such as refractive index, of the intermediate layer.

Typically, in the composition for forming the intermediate layer, the metal oxide precursor is present at about 10 to 50 mole-%, the complexing agent at about 10 to 60 mole-%, the acrylate compound at about 5 to 25 mole-%, and the silane monomers at about 25 to 60 mole-%, calculated from the combined amount of metal oxide precursor, any complexing agent, silane monomers and acrylate compound.

In embodiments, the siloxane polymer layer can be also optionally coated with a layer of a material capable of modifying surface properties of the siloxane layer. This layer can be referred to as a "top layer". For example, the siloxane polymer layer can be coated with a layer having a thickness of 5 to 150 nm for modifying the surface hardness, grease resistance, cleanability, abrasion resistance or optical properties of the siloxane polymer.

In one preferred embodiment, the siloxane layer comprises a siloxane polymer obtained by polymerizing at least three different silane monomers including at least one bi-silane. At least one of the silane monomers or the bi-silane includes an active group capable of achieving cross-linking to adjacent siloxane polymer chains.

In one embodiment, a method for producing a siloxane polymer is provided, the method including
(a) admixing a first solvent(s), at least three or four different silane monomers, including at least one bi-silane, to form a mixture,
  with the proviso that at least one of the silane monomers includes an active group capable of achieving cross-linking to adjacent siloxane polymer chains for example upon a thermal or radiation initiation;
(b) at least partially hydroxyling the silane monomers, for example by acidulating the mixture, and at least partially polymerizing and cross-linking the hydrolysed silane monomers;
(c) optionally changing the first solvent to a second solvent; and
(d) subjecting the mixture to conditions conducive to further cross-linking of the siloxane polymer.

The conditions conducive to further cross-linking of the siloxane polymer are formed, for example, by thermal or radiation initiation or a combination thereof.

According to another aspect a siloxane polymer composition is obtained by
(a) admixing a first solvent(s), at least three different silane monomers, at least one of which is a bi-silane, to form a mixture,
  with the proviso that at least one of the silane monomers includes an active group capable of achieving cross-linking to adjacent siloxane polymer chains for example upon a thermal or radiation initiation;
(b) subjecting the mixture to an acid treatment so that the silane monomers are at least partially hydrolysed, and the hydrolysed silane monomers, the silane monomers are at least partially polymerized and cross-linked;
(c) optionally changing the first solvent to a second solvent; and
(d) subjecting the mixture for example to thermal or radiation initiation so that further cross-linking of the siloxane polymer is achieved.

In the above embodiments, at least one of the silane monomers typically includes a group which is capable of achieving cross-linking to adjacent siloxane polymer chains upon a thermal or radiation initiation. Such a group is referred to as "active group". Exemplary active groups are epoxy, alicyclic epoxy groups (e.g. glycidyl), vinyl, allyl, acrylate and methacrylate groups and combinations thereof.

Exemplary initiation comprises subjecting the mixture to a radical initiator. Exemplary radical initiators are tert-amyl peroxybenzoate, 4,4-azobis(4-cyanovaleric acid), 1,1'-azobis(cyclohexanecarbonitrile), benzoyl peroxide, 2,2-bis(tert-butylperoxy)butane, 1,1-bis(tert-butylperoxy)cyclohexane, 2,2'-azobisisobutyronitrile (AIBN), 2,5-bis(tert-butylperoxy)-2,5-dimethylhexane, 2,5-bis(tert-Butylperoxy)-2,5-dimethyl-3-hexyne, bis(1-(tert-butylperoxy)-1-methylethyl) benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, bumene hydroperoxide, byclohexanone peroxide, bicumyl peroxide, lauroyl peroxide, 2,4-pentanedione peroxide, peracetic acid, and potassium persulfate.

In one embodiment, the radical initiator is AIBN.

Exemplary radiation initiation is subjecting the mixture to UV light. Radical initiators and photoacid/base generators (both non-ionic and ionic and cationic and anionic) can be used as UV initiators. Examples of such initiators include Ircacure 819, 184, 651, 907, 1173, 2022, 2100, Rhodorsil 2074 and Cyracure UVI-6976, Irgacure PAG 103, 121, 203, 250, 290 and CGI 725, 1907 amd GSID26-1, OXE-1, OXE-2, OXE-3, TPO, TPS and the like. Furthermore, sensitizers can be used in combination with the initiators to further accelerate the polymerization, by providing effective energy transfer to the UV polymerization initiators. Examples of such sensitizers include UVS-1331, UVS-1101, UVS-1221, 2,4-diethyl-9H-thioxanthen-9-one, and the like.

In one embodiment, cross-linking is carried out at a temperature in the range of about 30 to 200° C. Typically cross-linking is carried out at refluxing conditions of the solvent. This embodiment is applicable to a process where cross-linking is made, as a part of the synthesis, using a thermal initiator.

In an embodiment, the synthesis of the siloxane polymer is carried out in two steps.

In the first synthesis step of an embodiment, in the following also called the hydrolysis step, the monomers are hydrolysed in a first solvent in presence of catalyst. Such a catalyst is formed by an acid or mixture thereof. An example of catalysts is an aqueous e.g. nitric acid or hydrochloric acid or another mineral or organic acid.

In the second step, the polymerization step, the molecular weight of the material is increased by condensation polymerization. The water used in the hydrolysis step has typically a pH of less than 7, preferably less than 6, in particular less than 5.

During hydrolysis, a partial condensation is started and a relatively low molecular weight polymer is formed.

According to a preferable embodiment the subjecting the mixture to an acid treatment includes refluxing. A typical refluxing time is 2 h.

The monomers are condensation polymerized to achieve the final siloxane polymer composition. Generally, in case of tri-, di- and monofunctional molecules, the other functional groups (depending on the number of hydrolysable group number) of the precursor molecules can be organic functionalities such as linear, alkyl, alkene, aryl, cyclic, aliphatic groups. As examples of the organic groups, methyl group, ethyl group, propyl group, butyl group, octyl group, decyl group and the like can be used. The alkyl group preferably includes 1 to 10 carbon atoms. The alkyl group may be either linear or branched. A hydrogen atom in the organic group may be replaced by a fluorine atom or similar. Further examples include optionally substituted phenyl group, naphthyl group, hydroxyphenyl, phenanthrene, methylphenyl group, ethylphenyl group, chlorophenyl group, bromophenyl group, fluorophenyl group, diphenyl group, thioxanthone.

At least one of the organic groups contains one or more reactive functional groups e.g. amine, epoxy, acryloxy, allyl, methacryl or vinyl groups. These reactive organic groups can react during the thermal or radiation initiated curing step. Thermal and radiation sensitive initiators can be used to achieve specific curing properties from the material composition. When using the radiation sensitive initiators the material can perform as a negative tone photosensitive material in the lithography process.

According to one embodiment, the method of the present invention includes admixing at least one bi-silane (cf. below) and at least two silane monomers according to formulas I, II, III and IV:

$$R^1_a SiX_{4-a} \qquad \text{I}$$

$$R^2_b SiX_{4-b} \qquad \text{II,}$$

$$R^3_c SiX_{4-c} \qquad \text{III, and}$$

$$R^4_d SiX_{4-d} \qquad \text{IV}$$

wherein $R^1$, $R^2$, $R^3$ and $R^4$ are independently selected from hydrogen and a group comprising linear and branched alkyl, cycloalkyl, alkenyl, alkynyl, (alk)acrylate, epoxy, allyl, vinyl and alkoxy and aryl having 1 to 6 rings, and wherein the group is substituted or unsubstituted; X is a hydrolysable group or a hydrocarbon residue; a, b, c and d is an integer 1 to 3.

In any of the formulas above, the hydrolysable group is in particular an alkoxy group (cf. formula V).

According to an embodiment, the present invention provides for the production of organosiloxane polymers using di-, tri- or tetraalkoxysilane. The alkoxy groups of the silane can be identical or different and preferably selected from the group of radicals having the formula $$-O-R^5 \qquad \text{V}$$

wherein $R^5$ stands for a linear or branched alkyl group having 1 to 10, preferably 1 to 6 carbon atoms, and optionally exhibiting one or two substituents selected from the group of halogen, hydroxyl, vinyl, epoxy, acrylate, methacrylate and allyl.

Particularly suitable monomers are selected from the group of triethoxysilane, tetraethoxysilane, methyltriethoxysilane, methyltrimethoxysilane, ethyltriethoxysilane, n-butyltriethoxysilane, methyldiethoxyvinylsilane, dimethyldiethoxysilane, phenyltrimethoxysilane, phenantrene-9-triethoxysilane, vinyltrimethoxysilane, 3-glysidoxypropyltrimethoxysilane, aminopropyltrimethoxysilane, methacryloxypropyltrimethoxysilane, methacryloxypropyltriethoxysilane, acryloxypropyl-trimethoxysilane, allyltrimethoxysilane, epoxycyclohexylethyltrimethoxysilane, diphenylsilanediol, 1,2-bis(trimethoxysilyl)methane, 1,2-bis(trimethoxysilyl)ethane, glycidylmethacrylate, dimethyldimethoxysilane, 1-(2-(Trimethoxysilyl)ethyl)cyclohexane-3,4-epoxide, 1,2-bis(triethoxysilyl)ethane, 1H, 1H, 2H, 2H-perfluorodecyltrimethoxysilane, trimethoxy (3,3,3-trifluoropropyl)silane and combinations thereof.

In one embodiment, the method of the present invention includes admixing at least one bi-silane with other monomer(s), for example monomers of the above kind (formulas I to IV and V).

According to an embodiment the bi-silane is selected from molecules corresponding to formula VI:

$$(R^6)_3Si-Y-Si(R^7)_3, \qquad \text{VI}$$

wherein $R^6$ and $R^7$ are independently selected from hydrogen and a group consisting of linear or branched alkyl, cycloalkyl, alkenyl, alkynyl, (alk)acrylate, epoxy, allyl, vinyl, alkoxy and aryl having 1 to 6 rings, and wherein the group is substituted or unsubstituted; and Y is a linking group selected from bivalent unsubstituted or substituted aliphatic and aromatic groups, such as alkylene, arylene, —O-alkylene-O—; —O-arylene-O—; alkylene-O-alkylene, arylene-O-arylene; alkylene-$Z^1$C(=O)$Z^2$-alkylene, arylene-$Z^1$C(=O)$Z^2$-arylene and —O-alkylene-$Z^1$(=O)$Z^2$-alkylene-O—; —O-arylene-$Z^1$(=O)$Z^2$-arylene-O—, wherein $Z^1$ and $Z^2$ are each selected from a direct bond or —O—.

In the bivalent "alkylene" groups and other similar aliphatic groups, the alkyl residue (or residue derived from an alkyl moiety) stands for 1 to 10, preferably 1 to 8, or 1 to 6 or even 1 to 4 carbon atoms, examples include ethylene and methylene and propylene.

"Arylene" stands for an aromatic bivalent group containing typically 1 to 3 aromatic rings, and 6 to 18 carbon atoms. Such groups are exemplified by phenylene (e.g. 1,4-phenylene and 1,3-phenylene groups) and biphenylene groups as well as naphthylene or anthracenylene groups.

The alkylene and arylene groups can optionally be substituted with 1 to 5 substituents selected from hydroxy, halo, vinyl, epoxy and allyl groups as well as alkyl, aryl and aralkyl groups.

Preferred alkoxy groups contain 1 to 4 carbon atoms. Examples are methoxy and ethoxy.

The term "phenyl" includes substituted phenyls such as phenyltrialkoxy, in particular phenyltrimethoxy or triethoxy, and perfluorophenyl. The phenyl as well as other aromatic or alicyclic groups can be coupled directly to a silicon atom or they can be coupled to a silicon atom via a methylene or ethylene bridge.

Exemplary bi-silanes include 1,2-bis(trimethoxysilyl) methane, 1,2-bis(triethoxysilyl)methane, 1,2-bis(trimethoxysilyl)ethane, 1,2-bis(triethoxysilyl)ethane, 1-(dimethoxymethyl silyl)-1-(trimethoxysilyl)methane, 1-(diethoxymethylsilyl)-1-(triethoxysilyl)methane, 1-(dimethoxymethylsilyl)-2-(trimethoxysilyl)ethane, 1-(diethoxymethylsilyl)-2-(triethoxysilyl)ethane, bis(dimethoxymethylsilyl)methane, bis(diethoxymethylsilyl)methane, 1,2-bis (dimethoxymethylsilyl)ethane, 1,2-bis(diethoxymethylsilyl) ethane, 1,2-bis(trimethoxysilyl)benzene, 1,2-bis (triethoxysilyl)benzene, 1,3-bis(trimethoxysilyl)benzene, 1,3-bis(triethoxysilyl)benzene, 1,4-bis(trimethoxysilyl)benzene, 1,4-bis(triethoxysilyl)benzene.

Further examples include: 4,4'-Bis(triethoxysilyl)-1,1'-biphenyl; 1,4-Bis(triethoxysilyl)benzene; 1,3-Bis(triethoxysilyl)benzene.

In the present context, the term "bi-silane" is used for designating a compound comprising two organic residues which are linked to the same atom(s). In case of two identical (or even symmetrical) organic residues, the term "bis-silane" is also used.

According to a particular embodiment the silane monomers are selected from methyltriethoxysilane, phenyltrimethoxysilane, 3-methacryloxypropyltrimethoxysilane, diphenylsilanediol, and glycidoxypropyltrimethoxysilane, and the bis-silane is selected from 1,2-bis(triethoxysilyl) ethane, and 1,2-bis(trimethoxysilyl)methane.

According to a preferred embodiment, when using the above monomers, at least one of the monomers used for hydrolysis and condensation is selected from monomers having formulas I or II, wherein at least one substituent is an active group capable of achieving cross-linking to adjacent siloxane polymer chains upon a thermal or radiation initiated curing step.

For preparing the polymer, the molar portion of units derived from monomers of the above kind (or the molar portion of monomers containing the active group calculated from the total amount of monomers) is about 1 to 95%, preferably about 10 to 90%, in particular about 30 to 90%, for example 50 to 90% or 60 to 90%.

One embodiment comprises using a first monomer containing a first active group and a second monomer containing a second active group, the first active group being different from the second active group. For example, the first active group can be selected from the group of epoxy, including alicyclic epoxy groups (e.g. glycidyl), and vinyl and allyl groups, and the second active group can be selected from acrylate and methacrylate groups.

In embodiment, the molar ratio between monomers containing a first active group, e.g. selected from epoxy, including alicyclic epoxy groups (e.g. glycidyl), and vinyl and allyl groups, to monomers containing a second active group, e.g. selected from acrylate and methacrylate groups, varies in the range of 1:100 to 100:1, in particular 1:10 to 10:1, for example 5:1 to 1:2 or 3:1 to 1:1.

In some embodiments, the components containing the second active group also be selected from acrylate and metacrylate containing compounds other than silane monomers, such as tetraethylene glycol diacrylate, trimethylolpropane triacrylate, pentaerythritol triacrylate, ditrimethylolpropane tetraacrylate, dipentaerythritol pentaacrylate, and dipentaerythritol hexaacrylate and combinations thereof.

In some embodiments, the active group or active groups will be present in a concentration of about 1 to 35% based on the molar portion of monomers.

It is preferable to have the bi-silane (or bis-silane) present at a molar amount of 1 to 50 mole %, preferably between 3-35 mole %.

In one embodiment, a silane composition comprises at least 40 mole % of a monomer selected from (3-glycidoxypropyl)trimethoxysilane, 1-(2-(Trimethoxysilyl)ethyl)cyclohexane-3,4-epoxide, (3-glycidoxypropyl)triethoxysilane, (3-glycidoxypropyl)tripropoxysilane, 3-glycidoxypropyltri (2-methoxyethoxy)silane, 2,3-epoxypropyltriethoxysilane, 3,4-epoxybutyltriethoxysilane, 4,5-epoxypentyltriethoxysilane, 5,6-epoxyhexyltriethoxysilane, 5,6-epoxyhexyltrimethoxysilane, 2-(3,4-epoxycyclohexyl)ethyltriethoxysilane, 2-(3,4-epoxycyclohexyl)ethyltrimethoxysilane, 4-(trimethoxysilyl)butane-1,2-epoxide; at least 20 mole-% of a monomer selected from methacryloxypropyltrimethoxysilane, methacryloxypropyltriethoxysilane, and acryloxypropyl-trimethoxysilane; and at the most 40 mole-% of a bisilane selected from 1,2-bis(trimethoxysilyl)methane, 1,2-bis(triethoxysilyl)methane, 1,2-bis(trimethoxysilyl)ethane, 1,2-bis(triethoxysilyl)ethane, 1-(dimethoxymethylsilyl)-1-(trimethoxysilyl)methane, 1-(diethoxymethylsilyl)-1-(triethoxysilyl)methane, 1-(dimethoxymethylsilyl)-2-(trimethoxysilyl)ethane, 1-(diethoxymethylsilyl)-2-(triethoxysilyl)ethane, bis(dimethoxymethylsilyl)methane, bis(diethoxymethylsilyl)methane, 1,2-bis(dimethoxymethylsilyl)ethane, 1,2-bis(diethoxymethylsilyl)ethane, 1,2-bis (trimethoxysilyl)benzene, 1,2-bis(triethoxysilyl)benzene, 1,3-bis(trimethoxysilyl)benzene, 1,3-bis(triethoxysilyl)benzene, 1,4-bis(trimethoxysilyl)benzene, 1,4-bis(triethoxysilyl)benzene, 4,4'-Bis(triethoxysilyl)-1,1'-biphenyl; 1,4-Bis (triethoxysilyl)benzene and 1,3-Bis(triethoxysilyl)benzene.

For example, a silane composition of the present kind may comprise at least 40 mole-% of 3-glycidoxypropyl) trimethoxysilane and at least 20 mole-% of methacryloxypropyltrimethoxysilane.

According to an embodiment at least one of the at least three or more different silane monomers comprises one or more reactive functional groups which are capable of achieving further cross-linking of the siloxane polymer under initiation by a photo or thermal initiator compound.

Although three different silane monomers will already yield siloxane polymers having combinations of properties of bendability, abrasion resistance and adherence, it is possible to employ four or more different silane monomers. In particular the at least three, for example three to five silane monomers, can be selected from monomers of formulas I to IV/V, and one to three bi-silane monomers can be selected from bi-silanes of formula VI.

In the present context, in one embodiment, the method for producing a siloxane polymer is performed in a first solvent. Suitable solvents are, for example, acetone, tetrahydrofuran (THF), toluene, 2-propanol, methanol, ethanol, propylene glycol propyl ether, methyl-tert-butylether (MTBE), propylene glycol monomethylether acetate (PGMEA), methyl ethyl ketone, methyl isobutyl ketone, propylene glycol monomethylether (PGME) and propylene glycol propyl ether (PnP).

According to an embodiment the method further includes changing the first solvent to a second solvent. The solvent change is done after the treatment with acid. The first solvent is preferably selected from acetone, 2-propanol, ethanol, 1-propanol, methyl ethyl ketone, methyl isobutyl ketone, 1-methoxy-2-propanol or PGMEA, and the second solvent is preferably selected from 1-methoxy-2-propanol, methyl ethyl ketone, PGMEA or PnP or methyl isobutyl ketone or mixture.

The optional solvent change is advantageous, since it assists the removal of water and alcohols formed during hydrolysis of the silane monomers. In addition, it improves the properties of the final siloxane polymer solution when used as coating layer(s) on substrate.

The siloxane polymer prepared according to the method of the present invention is partially cross-linked. In the present context, the term "partially cross-linked" means that the polymer is capable of further cross-linking at conditions conducive to cross-linking. In practice, the polymer still contains at least some reactive, cross-linking groups after the first polymerisation step. The further cross-linking, which typically takes place after deposition of the partially cross-linked composition on a substrate, will be described below.

In one embodiment, the molar ratio of Si(OH) groups to Si (total) in the composition used for depositing a layer on a substrate is on the order of 1 to 100, in particular 10 to 80, for example 15 to 50. Particularly interesting results are obtained at molar ratios of about 25 to 35 Si(OH) groups to Si (total). Using the indicated ratio, a partially cross-linked polymer is readily obtained at the first stage.

The molecular weight range of the siloxane polymer which is partially cross-linked is in the range of 1500 to 35,000, preferably about 2,000 to 30,000, in particular about 2,000 to 20,000 g/mol. The polymer molecular weight can be adjusted to make it suitable for use with a specific developer in a lithographic patterning process.

According to an embodiment, the method further comprising admixing nanoparticles (or similar nano-, or microscale rods, crystals, spheres, dots, buds etc.) or compounds with the polymer compositions. The nanoparticles or compounds are in particular selected from the group of light scattering, light absorbing, light emitting and/or conductive pigments, dyes, organic and inorganic phosphors, oxides, quantum dots, polymers or metals. The above mentioned dopants can improve coating material mechanical, optical, chemical or physical properties or provide added functionality for the layer.

In one embodiment, by incorporating suitable components into the present siloxane polymer composition, properties selected from anti-glare and UV-block and combinations thereof can be reached. It has surprisingly been found that with the present composition precipitation or agglomeration (or both) of added components can effectively be avoided.

Further, one particular advantage which is obtained with the present compositions is that the cured siloxane layers exhibit not only bendability but also excellent abrasion and scratch resistance as will be discussed below.

Components suitable to provide UV-block properties (UV blocking agents) are for example selected from the group of 2-(2-Hydroxy-5-methylphenyl)benzotriazole, 2-[3-(2H-Benzotriazol-2-yl)-4-hydroxyphenyl]ethyl methacrylate, 2,2'-Dihydroxy-4-methoxybenzophenone, Tris(2,4-di-tert-butylphenyl) phosphite, 2,3,4-Trihydroxybenzophenone, 4-Hydroxybenzophenone, 2,4-Dihydroxybenzophenone, Oxybenzone (2-Hydroxy-4-methoxybenzophenone), 2-(2H-Benzotriazol-2-yl)-4,6-bis(1-methyl-1-phenylethyl)phenol and combinations thereof. Typically UV blocking agents are incorporated in amount of 0.1 to 25%, preferably 1-15% by weight, of the solid matter, in the silane compositions.

To improve resolution of the material when applied to photolithography, the siloxane polymer can be optionally partially cross-linked during polymerization, in particular during or immediately after condensation polymerization. Various methods can be used for achieving cross-linking. For example, cross-linking method where two chains are joined via reactive groups not affecting any of the active groups intended for the UV photolithography can be employed. To mention an example, hydrosilylation for example using a proton on one chain reacting with a double bond on another chain will achieve cross-linking of desired kind. Another example is cross-linking through double bonds or epoxy groups.

Different active groups are preferably used for cross-linking and for photolithography. Thus, the cross-linking of the siloxane polymer can be achieved with an active group having double bonds or epoxy groups or both, such as epoxy, vinyl or allyl or methacrylate group using radical initiators and photoacid generators.

Epoxy groups can be employed for UV-lithography and visa versa. The proportion of active groups required for cross-linking is generally smaller than for UV lithography, e.g. about 0.1 to 10 mol %, based on the monomers, for cross-linking and about 5 to 50 mol %, based on the monomers, for UV lithography.

The amount of the initiator added to the reaction mixture/solution is generally about 0.1 to 10%, preferably about 0.5 to 5%, calculated from the mass of the siloxane polymer.

As a result of the partial cross-linking, the molecular weight will typically be 2- to 10-folded. Thus from a molecular weight in the range of about 500 to 2000 g/mol, the cross-linking will increase it above 3,000, preferably to 4,000-20,000 g/mol.

Other additives typically used with the coating materials include chemicals that can further modify the final surface properties of coated and cured film or improve wettability/adhesion properties of the coating layer to a substrate or other coating layer or improve coating drying and packing behavior during deposition and drying to reach good visual quality. These additives can be surfactants, defoamers, anti-fouling agents, wetting agents etc. Examples of such additives include: BYK-301, BYK-306, BYK-307, BYK-308, BYK-333, BYK-051, BYK-036, BYK-028, BYK-057A, BYK-011, BYK-055, BYK-036, BYK-088, BYK-302, BYK-310, BYK-322, BYK-323, BYK-331, BYK-333, BYK-341, BYK-345, BYK-348, BYK-377, BYK-378, BYK-381, BYK-390, BYK-3700. 0.01-5% by weight of solids. 1 ja 1%

Before further condensation the excess of water is preferably removed from the material and at this stage it is possible to make a solvent exchange to another synthesis solvent if desired. This other synthesis solvent may function as the final or one of the final processing solvents of the siloxane polymer. The residual water and alcohols and other by-products may be removed after the further condensation step is finalized. Additional processing solvent(s) may be added during the formulation step to form the final processing solvent combination. Additives such as thermal initiators, radiation sensitive initiators, sensitizers, surfactants and other additives may be added prior to final filtration of the siloxane polymer. After the formulation of the composition, the polymer is ready for processing in, for example, roll-to-roll film deposition or in a lithographic process.

By adjusting the hydrolysis and condensation conditions it is possible to control the concentration/content of the group capable of being deprotonated (e.g. an OH-group) and any residual leaving groups from the silane precursors (e.g. alkoxy groups) of the siloxane polymer composition and also to control the final molecular weight of the siloxane polymer. This greatly affects dissolution of the siloxane polymer material into the aqueous based developer solution. Furthermore, the molecular weight of the polymer also greatly effects on the dissolution properties of the siloxane polymer into developer solutions.

Thus, for example, it has been found that when the final siloxane polymer has a high content of hydroxyl groups remaining and a low content of alkoxy (e.g. ethoxy) groups, the final siloxane polymer can be dissolved into an alkaline-water developer solution (e.g. tetra methyl ammonium hydroxide; TMAH, or potassium hydroxide; KOH).

On the other hand if the remaining alkoxy-group content of the final siloxane polymer is high and it contains hardly any OH-groups, the final siloxane polymer has a very low solubility in an alkaline-water developer of the above kind. The OH-groups or other functional groups, such as amino ($NH_2$), thiol (SH), carboxyl, phenol or similar that result in solubility to the alkaline developer systems, can be attached directly to the silicon atoms of the siloxane polymer backbone or optionally attached to organic functionalities attached into the siloxane polymer backbone to further facilitate and control the alkaline developer solubility.

After synthesis, the siloxane polymer composition can be diluted using a proper solvent or solvent combination to give a solid content which in film deposition will yield the preselected film thickness.

Usually, a further amount of an initiator molecule compound is added to the siloxane composition after synthesis. The initiator, which can be optionally similar to the one added during polymerization, is used for creating a species that can initiate the polymerization of the "active" functional group in the UV curing step. Thus, in case of an epoxy group, cationic or anionic initiators can be used. In case of a group with double bonds as "active" functional group in the synthesized material, radical initiators can be employed. Also thermal initiators (working according to the radical, cationic or anionic mechanism) can be used to facilitate the cross-linking of the "active" functional groups. The choice of a proper combination of the photoinitiators and sensitizers also depends on the used exposure source (wavelength). Furthermore the selection of the used sensitizer depends on the selected initiator type.

The concentration of the thermal or radiation initiator and sensitizers in the composition is generally about 0.1 to 10%, preferably about 0.5 to 5%, calculated from the mass of the siloxane polymer.

The composition as described above may comprise solid nanoparticles or other compounds in an amount of between 1 and 50 wt-% of the composition. The nanoparticles (or similar nano-, or microscale rods, crystals, spheres, dots, buds etc.) are in particular selected from the group of light scattering, light absorbing, light emitting and/or conductive pigments, dyes, organic and inorganic phosphors, oxides, quantum dots, polymers or metals.

According to another embodiment, the present invention concerns a method for covering a substrate, the method including providing a siloxane polymer composition obtainable by the method described above and depositing the siloxane polymer composition on the substrate.

The deposited siloxane polymer composition forms a film, in particular a thin film on the substrate, in particular the surface of the substrate. Typically, after deposition, or during the deposition step, the solvent is evaporated and the film dried, preferably by thermal drying or optionally by vacuum and/or thermal drying combined. This step is also referred to as pre-curing.

In a second, subsequent step the film is cured to final hardness by using UV exposure followed by thermal curing at elevated temperature.

In one embodiment, the pre-curing and the final curing steps are combined by carrying out heating by using an increasing heating gradient. In addition to the thermal cure only process, the curing can be performed in three steps, the process comprising thermal pre-cure and UV-cure followed by final thermal cure. It is also possible to apply a two step curing process where thermal pre-cure is followed by UV-cure. In such a case no final thermal cure is preferably applied after UV-cure).

According to a particular embodiment the method further includes developing the deposited film. In one embodiment, developing comprises exposing (full area or selective exposure using photomask or reticle or laser direct imaging) the deposited siloxane polymer composition to UV light. The step of developing is typically carried out after any pre-curing step and before a final curing step.

Thus, in one embodiment the method comprises
pre-curing or drying the siloxane polymer film (or structure) deposited on the substrate;
optionally exposing the thus obtained film (or structure);
optionally developing the thus obtained film; and
curing the film or structure.

Exemplary epoxy-functional group containing monomers include (3-glycidoxypropyl)trimethoxysilane, 1-(2-(Trimethoxysilyl)ethyl)cyclohexane-3,4-epoxide, (3-glycidoxypropyl)triethoxysilane, (3-glycidoxypropyl)tripropoxysilane, 3-glycidoxypropyltri(2-methoxyethoxy)silane, 2,3-epoxypropyltriethoxysilane, 3,4-epoxybutyltriethoxysilane, 4,5-epoxypentyltriethoxysilane, 5,6-epoxyhexyltriethoxysilane, 5,6-epoxyhexyltrimethoxysilane, 2-(3,4-epoxycyclohexyl)ethyltriethoxysilane, 2-(3,4-epoxycyclohexyl)ethyltrimethoxysilane, 4-(trimethoxysilyl)butane-1,2-epoxide.

Further examples of functionalizaed compounds are acrylate and metacrylate compounds, such as tetraethylene glycol diacrylate, trimethylolpropane triacrylate, pentaerythritol triacrylate, ditrimethylolpropane tetraacrylate, dipentaerythritol pentaacrylate, and dipentaerythritol hexaacrylate and combinations thereof. Such compounds can be used as part of the silane compositions.

According to a particular embodiment the method further includes curing the siloxane polymer composition.

The thickness of the siloxane polymer composition on the substrate (i.e. the film thicknesses) may range e.g. from 5 nm to 30 μm or higher.

Thin films can be deposited on a substrate by using slot coating, combined slot+spin coating, spin coating, spray coating, ink-jet printing, curtain coating, roller, roll-to-roll, printing (to mention few typical liquid phase deposition methods). Furthermore, the siloxane polymer composition can be deposited by directly patterning by a lithography process (or other patterning method e.g. gravure, flexo graphic or other printing, embossing, 3D/4D printing, ink-jet printing and laser direct imaging) or combinations thereof.

A film produced according to the invention typically has a dielectric constant of 3.0-5.0 or below at a frequency of 100 kHz. The index of refraction lies between 1.2 to 2.0 at a wavelength of 633 nm.

According to an embodiment, the films exhibit a cross-linking degree of 70% or more at a UV dose of 50-500 mJ/cm$^2$ at I-line or g-,h-,i-line or broadband wavelength of mercury UV source or similar used in the industry.

The final coating film thickness has to be optimized according for each device and structure fabrication process.

By means of the invention, materials are provided which are suitable for produce films and structures. The layers can be deposited on various substrate surfaces, such as glass, quartz, silicon, silicon nitride, polymers, metals and plastics. Furthermore, the materials can be deposited on number of different surfaces such as different oxides, doped oxides, semimetals and the like.

The layers can be obtained by conventional and cost-efficient processing from the liquid phase. Such processing methods include spin-on, dip, spray, ink-jet, roll-to-roll, gravure, reverse gravure, bar coating, slot, flexo-graphic, curtain, screen printing coating methods, extrusion coating and slit coating, but are not limited to these.

The patterning of the thermally and/or irradiation sensitive material compositions can be performed via direct lithographic patterning, conventional lithographic masking and etching procedure, imprinting and embossing, but are not limited to these.

The compositions can be used for making layers which are cured at relatively low processing temperatures, e.g. at temperatures of max 300° C. or min at temperature of 50° C. and in the range between these limits.

Depending on the used substrate the material is usually cured in convection oven, by IR-lamp curing, or forced air cure between 50° C. and 300° C.

Also specifically in cases where the material layer is deposited directly on a substrate, which is already attached to the display substrate (or other substrate which can withstand a low cure temperature) the processing temperature is limited to max 120° C. or even to temperatures below 100° C. or even to temperatures below 70° C.

Typical curing time can be example 2-60 min. The curing temperature depends on cure method and type used; the cure methods can range from roll-to-roll coating type forced air or IR ovens when substrate is moving during cure to conventional batch convection ovens. Generally, curing temperature is from 25 to 350° C. The material layer composition should deliver properties such as sufficient chemical resistivity against the aggressive etch solutions, good thermal and environmental stability, non-yellowing characteristics and high optical quality, good compatibility in terms of adhesion, sufficient hardness at the low final cure temperature (final cure temperature can be below 120° C. or below 100° C. or even below 70° C.). The material can be also used at higher final cure temperatures if substrate/underlayer type allows (e.g. 200° C., 240° C. or higher), but it is specifically designed to deliver performance also at a low temperature, i.e. below 120° C.

The layers deposited from the compositions and cured as explained can perform as a planarization layer on a substrate or electronic device which may have cavities/via's and/or protruding structures on top of it. This substrate may be part of a display device (e.g. liquid crystal display or OLED display or sensor or color filter or cover substrate).

Figure 1:
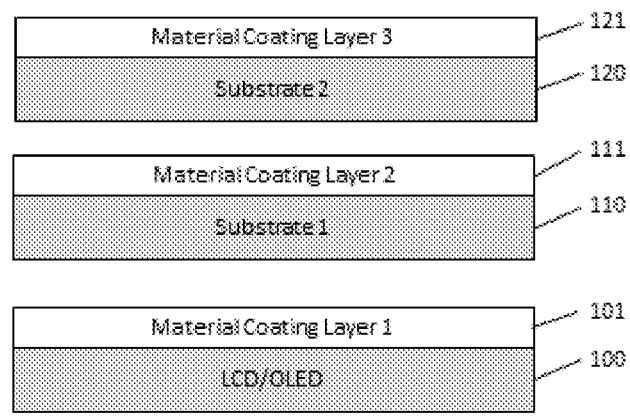
FIG. 1 shows in cross-section three different substrate and coating film combinations.

Turning next to the drawings, it can be noted that FIG. 1 represents an exemplary flexible/bendable display device cross-section structure, wherein multiple material layers made of a siloxane polymer composition of the present invention are used to deliver specific functions.

The LCD/OLED/TFT substrate, 100, is formed by the actual display (LCD or OLED) with optionally a colour filter array integrated on it. The Flexible LCD/OLED is manufactured on flexible/bendable substrate, 100, and a material Coating Layer 1, 101, can be used in the device configuration as patterned structure or non-patterned film to deliver specific function while having properties suitable for retaining the flexibility and bendability of the final device configuration. Substrate 1, reference numeral 110, represents a plastic touch sensor, which is inherently flexible and bendable. Again a material coating layer 2, 111, can be used in the sensor configuration as patterned structure or non-patterned film to deliver specific function while having properties suitable for retaining the flexibility and bendability of the sensor and device configuration. The sensor configuration can be such that sensor is integrated with color filter array or polarizer.

Substrate 1 can be used as the outmost substrate in the device configuration or optionally another substrate can be used as the outmost cover substrate for the display device. This optional Substrate 2, 120, is also a plastic substrate with suitable flexibility and bendability characteristics. Again a material coating layer 3, 121, can be used as patterned structure or non-patterned film to deliver specific function while having properties suitable for retaining the flexibility and bendability of, for example, a sensor and display device configuration.

The material coating layers, 101, 111 and 121, can serve multiple functions, such as, optical function, hard coating function, insulation, planarization, etch stop, optical, mechanical functions in the different layers with varying thicknesses from 50 nm-50 μm. The coating material layer 1 (reference numeral 101) shown can be also used in the LCD display back light unit (BLU) layer for as protection layer (hard coating) or serve a optical function improving efficiency of the BLU unit. It can be used on either the light guide plate or the diffusor or reflector or brightness enhancement sheet surfaces. In addition to the BLU unit the material coating layer can be used also a protective and optical coating on polarizer substrates used in the LCD/OLED display device. The key characteristics of the material coating layers, 101, 111 and 121 in addition to the other properties is that is has excellent flexibility and bendability characteristics enabling specific manufacturing processes of the device sub-components finally enables the realizations of a truly flexible/bendable final device configuration.

The substrate material in general can be various types of plastic, polymer, glass or metal. The substrate has typically one or two or more conductive (or semi-conductive) materials deposited and structured on its surface. The conductive (or semi-conductive) layers can for example be made of transparent conductive oxide (or doped oxide) layer or layers and/or metal layer or layers. The transparent conductive oxide can be example indium-tin-oxide (ITO) and typically is a patterned layer on the substrate surface. The transparent conductive oxide or doped oxide layers can be formed by sputtering, CVD or PVD processes. The metal layer can be a sputtered or PVD deposited metal (example Aluminium and Molybdenum). The conductive layer can also be formed using materials and methods such as wire mesh (e.g. copper), metal-mesh (e.g. copper, aluminium and silver), silver (or similar) "nanowires", carbon nanotubes/nanobuds, conductive polymers (example PEDOT), graphene and ITO or similar conductive inks (e.g. nanoparticles dispersed in solvent or other matrix).

The coating material layer fulfills several requirements. Firstly, the material layer has good adhesion (requirement 4B-5B; ASTM D3359-09, Cross-Hatch tester) on multiple surfaces, e.g., on a substrate (e.g. different plastics or glass), on any other polymer material (such as the black matrix material or white matrix material) and on conductive layers such as ITO and metals (molybdenum/aluminium/molybdenum/copper/silver etc).

Secondly, the material layer in flexible and foldable device structure has to naturally be also flexible.

FIG. 2 illustrates a cross-section of flexibility and foldability testing of the coating material (siloxane polymer film) 210 on a flexible substrate 200, such as 125 μm thick PET. The substrate thickness can vary from very thin substrates (e.g. 10-50 μm) which are very flexible/bendable to thick rigid substrates (e.g. 0.7 mm-3 mm) plastics such as PC and PMMA, which typically are not flexible although can be deformed by heat. The cylindrical mandrel 205 is used for determining the flexibility and foldability property.

FIG. 2 illustrates how the coated sheets are bent around the mandrel 205 with
a) the outfolding method [coating 210 facing out] and
b) the infolding method [coating 210 facing towards mandrel].

Mandrels of decreasing diameter are used until cracks appear, which defines the foldability limit of the coating+ substrate combination. The smaller the mandrel diameter is without any cracks in the coating 210, the more flexible/foldable the coating is.

As can be seen from the result given in Table 1 below, typically for the present siloxane polymer layers having a thickness of about 6 to 7 μm, the infolding mandrel diameter is less than 0.2 mm and the outfolding mandrel diameter is less than about 1 mm, in particular less than about 0.4 mm.

Thirdly, the material layer has good chemical resistivity against the wet etch chemicals, developers, solvents and strippers. The chemical resistivity is verified typically again by adhesion test after chemical resistivity test (requirement 4B-5B; before and after; ASTM D3359-09, Cross-Hatch tester). The wet etchants are used during the lithographic patterning process steps of the conductive layers or other polymer layers. These etchants and strippers include KOH, potassium hydroxide (0.04%-7%); Aqua regia ($HNO_3$:HCl, typically in 1:3 ratio; 3.0 N to 9.0 N); NaOH, (3 to 6%); TMAH, (0.2% to 3%); Metal etchant [typical for Mo/Al/Mo; $H_3PO_4$:$HNO_3$:$CH_3COOH$, e.g. 55-70:5-9:4-8 (v/v/v)]; $FeCl_3$:HCl (20-25%: 12-16%, respectively); Oxalic acid (0.2% to 2.5%); N-methyl-2-pyrrolidone; or other wet etchants, developers, solvents or strippers typically used in the lithography process. The wet etch solutions are used at various temperatures (20-80° C.) and at different concentrations depending on the actual layers to be etched and other layers already deposited on the substrate.

Forthly, the material layer has good hardness (preferably over 3H, over 4H, over 5H, over 6H or even over 7H; ASTM D3363-00, Elcometer tester).

In case e.g. low glass transition temperature plastics substrates are used the curing temperature is limited to max 120° C. or even to temperatures below 100° C. or below 70° C. The curing time is typically restricted by the used coating deposition method. In case of roll-to-roll methods the curing time is relatevily short and has to be adjusted by the line speed. The curing can be a combination of thermal+UV curing or UV+thermal curing or in some cases thermal+UV+thermal curing is preferred. The material layer composition has to deliver all above properties at the low final cure temperature. Some flexible plastic substrate materials (e.g. polyimide) can withstand higher final cure temperatures (even up to 250° C.). The material can also withstand such temperatures, but it is specifically designed to deliver performance also at the low temperature.

Figure 3:
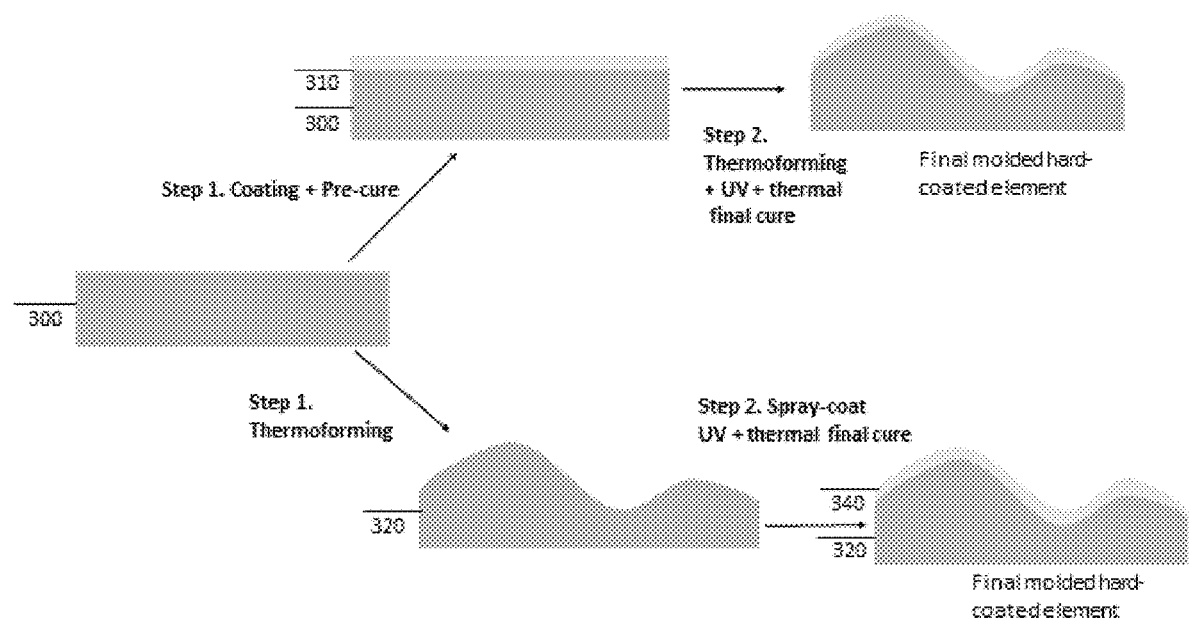
FIG. 3 represents cross-section view of substrate 300 and material film 310 used in thermoforming process.

FIG. 3 represents cross-section of a substrate 300 and a material film 310 in so called thermoforming process. The substrate 300 can be rather thick plastic, such as PC or PMMA or it can be thin plastic, such as PET (e.g. 125 μm). There are specific thermoformable plastic grades available from substrate suppliers. In thermoforming process the substrate 300 itself can be molded first with regular thermoforming process to produce thermoformed plastic element with various shapes 320. The protective flexible hard coat 340 can be deposited by spray coating followed by thermal and UV curing steps to result in final component for a device. FIG. 3 shows also an alternative way of applying the flexible hard-coat on thermoformable plastic substrate 300, example 125 μm thick PET. The coating material 310 can be applied to the substrate 300 using a liquid phase deposition method to the planar substrate or roll-to-roll coated, followed by pre-curing the coating with heat or combination of thermal and/or UV before thermoforming the whole stack prior to final curing (with UV and/or thermal cure) of the hard-coated molded element. In case, substrate 300 is a thin film (such as 125 μm PET or PC) it is typical to bring the initially hardcoated substrate into contact with another plastic component prior to thermoforming to serve as the outmost layer in the final device. This kind of thermoforming and hardcoated application approach is used in, for example, automotive and white goods industry. The flexibility of the coating material is important property for these hard-coat structures as the shape of the 3D thermoformed elements can vary a lot.

Figure 4:
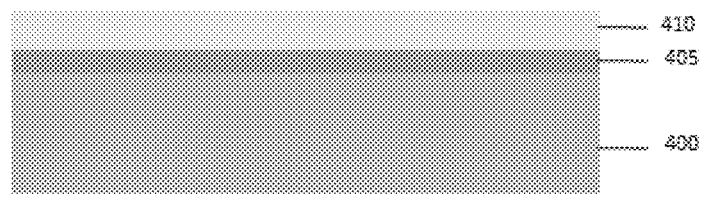
FIG. 4 shows the cross-section of a substrate 400 and material films 405 and 410.

FIG. 4 shows the use of an optional coating layer or surface treatment 405 between the substrate 400 and coating material 410. The coating layer 405 can be a primer to achieve good adhesion between the substrate 400 and coating material 410 or it can also serve an optical function removing iridescence effect from the substrate/coating stack. It can also function as optical layer to improve optical properties of the double-layer coating stack compared to single-layer coating only.

The following non-limiting examples illustrate specific embodiments.

EXAMPLES

Example 1

1,2-bis(triethoxysilyl)ethane (30.00 g), Phenyltrimethoxysilane (6.71 g), 3-glycidoxypropyltrimethoxysilane (21.33 g), 3-(Trimethoxysilyl)propyl methacrylate (1.40 g) and hexyl-trimethoxysilane (2.33 g) were weighed to a round bottom flask. 77.69 g of acetone was added to a round bottom flask 2.33 g of water (0.1 M $HNO_3$) was added to the reaction flask and the reaction mixture was refluxed at 95° C. in an oil bath for 2 hours. Solvent was changed from acetone to PGME (40 g added). Solid content was adjusted to 50%. AIBN (0.16 g) was added to the material and the material solution was refluxed at 105° C. in an oil bath for 45 min.

Example 2

1,2-bis(triethoxysilyl)ethane (60.00 g), Diphenyldimethoxysilane (16.66 g), 3-glycidoxypropyltrimethoxysilane (37.6 g), 3-(Trimethoxysilyl)propyl methacrylate (2.48 g)

were weighed to a round bottom flask. 115 g of acetone was added to a round bottom flask. 28.09 g of water (0.1 M HNO$_3$) was added to the reaction flask and the reaction mixture was refluxed at 95° C. in an oil bath for 2 hours. Solvent was changed from acetone to PGME (74.26 g added). Solid content was adjusted to 50%.

Example 3

30 g 1,2-bis(triethoxysilyl)ethane and 30 g acetone were mixed in a round bottom flask. Solution was heated to 60° C. and 4.57 g of water (0.1 M HNO$_3$) was added to the reaction flask. The reaction mixture was refluxed at 95° C. in an oil bath for 1 hour. Phenyltrimethoxysilane (6.74 g), 3-glycidoxypropyltrimethoxysilane (21.51 g), 3-(Trimethoxysilyl)propyl methacrylate (1.49 g), hexyltrimethoxysilane (2.27 g) and 32.01 g of acetone were added to a reaction flask and 11.65 g water (0.1 M HNO$_3$) was added. The reaction mixture was refluxed at 95° C. in an oil bath for 2 hours. Solvent was changed from acetone to PGME (40 g added). Solid content was adjusted to 50%. AIBN (0.15 g) was added to the material and the material solution was refluxed at 105° C. in an oil bath for 45 min. The material had a molecular weight (Mw) of 9000.

Example 4

11.43 g of water (0.1 M HNO$_3$) was added to Glycidoxypropyltrimethoxysilane (100 g). The reaction mixture was stirred at room temperature for 1 hour. 1,2-bis(triethoxysilyl)ethane (150 g) and Phenyltrimethoxysilane (41.94 g) were added to a reaction flask and 65.1 g water (0.1 M HNO$_3$) was added. Reaction solution was stirred at room temperature for 18 hours. After stirring all volatiles were removed in vacuum and solid content was adjusted to 50% by adding PGME.

Example 5

Trimethoxymethylsilane (5.76 g) and glycidoxypropyltrimethoxysilane (30 g) were placed in a round bottom flask. 0.1 M aqueous HNO$_3$ (8.68 g) was added and the resulting mixture was stirred for 1 h. 1,2-bis(triethoxysilyl)ethane (60.04 g) and PGME (30 g) were added to the reaction solution. 0.1 M aqueous HNO$_3$ (2.89 g) was added and the resulting mixture was stirred for 18 h. After stirring volatiles were removed in vacuum.

Example 6

3-(Trimethoxysilyl)propyl methacrylate (10 g) was placed in a round bottom flask and 0.1 M aqueous HNO$_3$ (1.73 g) was added. Reaction solution was stirred for 30 minutes. Glycidoxypropyltrimethoxysilane (47.50 g) and 1,2-bis(triethoxysilyl)ethane (57.11 g) were placed in another round bottom flask. 0.1 M aqueous HNO$_3$ (22.6 g) was added and the resulting mixture was stirred for 30 minutes. These two reaction mixtures were mixed together and refluxed 15 minutes at 95° C. Volatiles were evaporated resulting in a final material with 70% solid content.

Example 7

Trimethoxymethylsilane (5.76 g), 3-glycidoxypropyltrimethoxysilane (30 g) and acetone (35.76 g) were placed in a round bottom flask. 0.1M aqueous HNO$_3$ (8.68 g) was added and the resulting mixture was refluxed at 95° for 30 minutes. 1,2-bis(triethoxysilyl)ethane (60.04 g) and acetone (60.04 g) were added to the reaction solution. 0.1 M aqueous HNO$_3$ (17.39 g) was added and the resulting mixture was refluxed at 95° C. for 1 h. Solvent was changed from acetone to PGME. Solid content of the material was adjusted to 40% with PGME.

Example 8

1,2-bis(triethoxysilyl)ethane (60 g), 3-glycidoxypropyltrimethoxysilane (10.6 g), Tetraethyl orthosilicate (2.34 g) and acetone (72.94 g) were mixed in a round bottom flask. Solution was heated to 60° C. and 4.57 g of water (0.1 M HNO$_3$) was added to the reaction flask. 0.1 M aqueous HNO$_3$ (20.42 g) was added and the resulting mixture was refluxed at 95° C. for 1 h. Solvent was changed from acetone to PGME (40 g).

Example 9

1,2-bis(triethoxysilyl)ethane (30 g), 3-glysidoxypropyltrimethoxysilane (35.54 g), Phenylmethyldimethoxysilane (10.28 g), methyltriethoxysilane (13.41 g), methacryloxypropyltrimethoxysilane (2.33 g) and acetone (91.57 g) were weighed to a round bottom flask. 16.03 g of water (0.1 M HNO$_3$) was added to the reaction flask and the reaction mixture was refluxed at 95° C. for 2 hours. Solvent was changed from acetone to PGME. After solvent exchange AIBN (1.1 g) was added to the material and the material solution was refluxed at 105° C. in an oil bath for 45 min.

Example 10

1,2-bis(triethoxysilyl)ethane (30 g), 3-glysidoxypropyltrimethoxysilane (18.43 g), Phenyltrimethoxysilane (6.74 g), methacryloxypropyltrimethoxysilane (1.49 g), and 1H,1H, 2H,2H-Perfluorodecyltrimethoxysilane (1.14 g) and acetone (57.8 g) were weighed to a round bottom flask. 14.83 g of water (0.1 M HNO$_3$) was added to the reaction flask and the reaction mixture was refluxed at 95° C. for 2 hours. Solvent was changed from acetone to PGME and solid content was adjusted to 60% by adding PGME.

Example 11

1,2-bis(triethoxysilyl)ethane (40 g), 3-glysidoxypropyltrimethoxysilane (47.39 g), diphenyldimethoxysilane (18.38 g), methyltriethoxysilane (17.9 g), methacryloxypropyltrimethoxysilane (3.11 g) and acetone (30.19 g) were weighed to a round bottom flask. 16.03 g of water (0.1 M HNO$_3$) was added to the reaction solution and the reaction mixture was refluxed at 95° C. for 2 hours. Solvent was changed from acetone to PGME. After solvent exchange AIBN (0.3 g) was added to the material and the material solution was refluxed at 105° C. in an oil bath for 15 min.

Example 12

1,2-bis(triethoxysilyl)ethane (30 g), 3-glysidoxypropyltrimethoxysilane (18.8 g), Phenymethyldimethoxysilane (5.47 g), methacryloxypropyltrimethoxysilane (1.24 g) and acetone (55.51 g) were weighed to a round bottom flask. 14.12 g of water (0.1 M HNO$_3$) was added to the reaction flask and the reaction mixture was refluxed at 95° C. for 2 hours. Solvent was changed from acetone to PGME and solid content was adjusted to 50% by adding PGME.

Example 13

3-glysidoxypropyltrimethoxysilane (66.54 g), Phenymethyldimethoxysilane (40 g), methacryloxypropyltrimethoxysilane (31 g) and acetone (137.54 g) weighed to a round bottom flask. 28.34 g of water (0.1 M $HNO_3$) was added to the reaction flask and the reaction mixture was refluxed at 95° C. for 2 hours. Solvent was changed from acetone to PGME. Solid content of the material was adjusted to 40% by adding PGME.

Example 14

3-glysidoxypropyltrimethoxysilane (40 g), methacryloxypropyltrimethoxysilane (16.16 g) and 1,2-bis(triethoxysilyl)ethane (9.21 g), were weighed to a round bottom flask. 15.45 g of 0.1 M aqueous $HNO_3$ was added and the reaction solution was stirred 3 hours. Volatiles were removed in vacuum. Solid content was adjusted to 40% by adding PGME.

Example 15

3-glysidoxypropyltrimethoxysilane (40 g), methacryloxypropyltrimethoxysilane (16.16 g), 1,2-bis(triethoxysilyl)ethane (9.21 g) and acetone (49 g) were weighed to a round bottom flask. 15.45 g of 0.1 M aqueous $HNO_3$ was added and the reaction solution was refluxed at 95° C. for 2 hours. Solvent was exchanged from acetone to PGME (40.03 g).

Example 16

3-glysidoxypropyltrimethoxysilane (48.21 g), methacryloxypropyltrimethoxysilane (17.21 g), 1H,1H,2H,2H-Perfluorodecyltrimethoxysilane (1.57 g) and acetone (66.99 g) were weighed to a round bottom flask. 14.84 g of 0.1 M aqueous $HNO_3$ was added and the reaction solution was refluxed at 95° C. for 2 hours. Solvent was exchanged from acetone to PGME (40.14 g).

Example 17

3-glysidoxypropyltrimethoxysilane (40 g), methacryloxypropyltrimethoxysilane (16.16 g), 1,2-bis(triethoxysilyl)ethane (8.30 g), 1H,1H,2H,2H-Perfluorodecyltrimethoxysilane (1.48 g) and acetone (49.45 g) were weighed to a round bottom flask. 15.27 g of 0.1 M aqueous $HNO_3$ was added and the reaction solution was refluxed at 95° C. for 2 hours. Solvent was exchanged from acetone to PGME (41.60 g). Solid content of the material was 50%.

Example 18

3-glysidoxypropyltrimethoxysilane (40 g), methacryloxypropyltrimethoxysilane (16.16 g), 1,2-bis(triethoxysilyl)ethane (9.21 g) and 2-propanol (49 g) were weighed to a round bottom flask. 15.45 g of 0.1 M aqueous $HNO_3$ was added and the reaction solution was refluxed at 95° for 2 hours. Solvent was exchanged from 2-propanol to PGME (42.49 g).

Example 19

3-glysidoxypropyltrimethoxysilane (40 g), methacryloxypropyltrimethoxysilane (16.16 g), 1,2-bis(triethoxysilyl)ethane (9.21 g) and 2-propanol (49 g) were weighed to a round bottom flask. 15.45 g of 0.1 M aqueous $HNO_3$ was added and the reaction solution was stirred 18 h at room temperature. Solvent was exchanged from 2-propanol to PGME (40.34 g). Solid content of the material was 40%.

Example 20

3-glysidoxypropyltrimethoxysilane (50 g), methacryloxypropyltrimethoxysilane (6.52 g), 1,2-bis(triethoxysilyl)ethane (9.30 g) and acetone (49.36 g) were weighed to a round bottom flask. 15.56 g of 0.1 M aqueous $HNO_3$ was added and the reaction solution was refluxed at 95° C. for 2 hours. Solvent was exchanged from acetone to PGME (40.05 g).

Example 21

3-glysidoxypropyltrimethoxysilane (80 g), methacryloxypropyltrimethoxysilane (32.32), 1,2-bis(triethoxysilyl)ethane (18.42 g) and acetone (98 g) were weighed to a round bottom flask. 30.90 g of 0.1 M aqueous $HNO_3$ was added and the reaction solution was refluxed at 95° C. for 2 hours. Solvent was exchanged from acetone to PGME (90.50 g). Solid content of the material was adjusted to 50% by adding PGME. 0.98 g of ethyltrimethoxysilane was added and refluxed at 105° C. for 15 minutes.

Example 22

1,2-bis(triethoxysilyl)ethane (40 g), Methyltriethoxysilane (17.88 g), 3-glycidoxypropyltrimethoxysilane (29.62 g), 3-(Trimethoxysilyl)propyl methacrylate (3.11 g), Phenylmethyldimethoxysilane (27.4 g) and 118 g of acetone were added to a reaction flask and 28.93 g water (0.1 M $HNO_3$) was added. The reaction mixture was refluxed at 95° C. in an oil bath for 2 hours. Solvent was changed from acetone to PGME (70 g added). Solid content was adjusted to 40%. Molecular weight of the material was 1000.

Example 23

1,2-bis(triethoxysilyl)ethane (40 g), Methyltriethoxysilane (17.88 g), 3-glycidoxypropyltrimethoxysilane (41.47 g) 3-(Trimethoxysilyl)propyl methacrylate (3.11 g), Phenylmethyldimethoxysilane (18.28 g) and 121 g of acetone were added to a reaction flask and 28.93 g water (0.1 M $HNO_3$) was added. The reaction mixture was refluxed at 95° C. in an oil bath for 2 hours. Solvent was changed from acetone to PGME (70 g added). Molecular weight of the material was 1000.

Example 24

1,2-bis(triethoxysilyl)ethane (40 g), Methyltriethoxysilane (17.88 g), 3-glycidoxypropyltrimethoxysilane (41.47 g), 3-(Trimethoxysilyl)propyl methacrylate (3.11 g), Phenylmethyldimethoxysilane (18.28 g) and 121 g of acetone were added to a reaction flask and 28.93 g water (0.1 M $HNO_3$) was added. The reaction mixture was refluxed at 95° C. in an oil bath for 2 hours. Solvent was changed from acetone to PGME (70 g added). Solid content was adjusted to 50% and 0.296 g AIBN was added. Solution was refluxed at 105° C. for 1 hour. Molecular weight of the material was 4000.

Example 25

1,2-bis(triethoxysilyl)ethane (40 g), Methyltriethoxysilane (14.90 g), 3-glycidoxypropyltrimethoxysilane (29.13 g) 3-(Trimethoxysilyl)propyl methacrylate (2.59 g), Phenylmethyldimethoxysilane (15.23 g), 1H, 1H, 2H, 2H-Perfluorodecyltrimethoxysilane (2.37 g) and 104 g of acetone were added to a reaction flask and 25.79 g water (0.1 M $HNO_3$)

was added. The reaction mixture was refluxed at 95° C. in an oil bath for 2 hours. Solvent was changed from acetone to PGME (62.5 g added). Solid content was adjusted to 50%. Molecular weight of the material was 1000.

Example 26

1,2-bis(triethoxysilyl)ethane (40 g), Methyltriethoxysilane (14.90 g), 3-glycidoxypropyltrimethoxysilane (29.13 g), 3-(Trimethoxysilyl)propyl methacrylate (2.59 g), Phenylmethyldimethoxysilane (15.23 g), 1H,1H,2H,2H-Perfluorodecyltrimethoxysilane (2.37 g) and 104 g of acetone were added to a reaction flask and 25.79 g water (0.1 M $HNO_3$) was added. The reaction mixture was refluxed at 95° C. in an oil bath for 2 hours. Solvent was changed from acetone to PGME (62.5 g added). Solid content was adjusted to 50% and 0.253 g AIBN was added. Solution was refluxed at 105° C. for 1 hour. Molecular weight of the material was 4000.

Example 27

1,2-bis(triethoxysilyl)ethane (35 g), Methyltriethoxysilane (15.64 g), 3-glycidoxypropyltrimethoxysilane (36.29 g) 3-(Trimethoxysilyl)propyl methacrylate (2.72 g), Phenyltrimethoxysilane (17.40 g) and 107 g of acetone were added to a reaction flask and 27.57 g water (0.1 M $HNO_3$) was added. The reaction mixture was refluxed at 95° C. in an oil bath for 2 hours. Solvent was changed from acetone to PGME (65 g added). Molecular weight of the material was 1000.

Example 28

1,2-bis(triethoxysilyl)ethane (135.20 g), Phenyltrimethoxysilane (24 g), 3-(Trimethoxysilyl)propyl methacrylate (5.46 g), 3-glycidoxypropyltrimethoxysilane (84.82 g) and 250 g of acetone were added to a reaction flask and 63.62 g water (0.1 M $HNO_3$) was added. The reaction mixture was refluxed at 95° C. in an oil bath for 2 hours. Solvent was changed from acetone to PGME (155 g added). Solid content was adjusted to 60%.

Example 29

1,2-bis(triethoxysilyl)ethane (40 g), Methyltriethoxysilane (17.88 g), 3-glycidoxypropyltrimethoxysilane (46.21 g) 3-(Trimethoxysilyl)propyl methacrylate (3.11 g), Phenylmethyldimethoxysilane (13.71 g), 1H,1H,2H,2H-Perfluorodecyl-trimethoxysilane (2.8 g) and 124 g of acetone were added to a reaction flask and 30.22 g water (0.1 M $HNO_3$) was added. The reaction mixture was refluxed at 95° C. in an oil bath for 2 hours. Solvent was changed from acetone to PGME (75 g added). Molecular weight of the material was 1000.

Example 30

1,2-bis(triethoxysilyl)ethane (40 g), Methyltriethoxysilane (17.88 g), 3-glycidoxypropyltrimethoxysilane (46.21 g) 3-(Trimethoxysilyl)propyl methacrylate (3.11 g), Phenylmethyldimethoxysilane (13.71 g), 1H,1H,2H,2H-Perfluorodecyltrimethoxysilane (2.8 g) and 124 g of acetone were added to a reaction flask and 30.22 g water (0.1 M $HNO_3$) was added. The reaction mixture was refluxed at 95° C. in an oil bath for 2 hours. Solvent was changed from acetone to PGME (75 g added). Solid content was adjusted to 50% and 0.209 g AIBN was added. Solution was refluxed at 105° C. for 1 hour. Molecular weight of the material was 4000.

Example 31

1,2-bis(triethoxysilyl)ethane (40 g), 3-glysidoxypropyltrimethoxysilane (24.58 g), Phenylmethyldimethoxysilane (9.48), methyltriethoxysilane (12.3 g), methacryloxypropyltrimethoxysilane (2.15 g) and acetone (88.51 g) were weighed to a round bottom flask. 22.71 g of water (0.1 M $HNO_3$) was added to the reaction flask and the reaction mixture was refluxed at 95° C. for 2 hours. Solvent was changed from acetone to PGME and solid content was adjusted to 50%.

Example 32

Material from example 15 was diluted to a solid matter content of 35% using PGME:PGMEA (methoxypropanol:propylene glycol monomethyl ether acetate) solution containing said components at a ratio of PGME:PGMEA=77:23 and another solution of solid mater content of 35% in PGME. UV-initiator UV-6976 in amount of 1 wt % of solid matter was added in the individual solutions of this example for creating a species that can initiate the polymerization in the UV curing step in the following comparative examples. In addition, 1 wt % of solid matter antifouling agent was added. The material was deposited on the plastic substrate such that the dry film thicknesses were between 5-15 μm. The deposited coating was cured in combination of thermal curing and UV curing. The thermal curing was done at 120° C. in convection oven.

Example 33

3-glysidoxypropyltrimethoxysilane (371.6 g) was weighed to a round bottom flask. 28.3 g of water (0.1MHNO3) was added to the reaction flask and the mixture was refluxed at 95° C. for 15 minutes. The reaction mixture was stirred at room temperature for another 18 h. Methacryloxypropyltrimethoxysilane (124.9 g), 1,2-bis(triethoxysilyl)ethane (7.43 g) and 29.4 g of water (0.1 M $HNO_3$) was added to the reaction mixture and the reaction solution was stirred 4 h at room temperature. 200 g of PGME was added to the mixture and volatiles were removed in vacuum. Solid content was adjusted to 40% by adding PGME.

Example 34

3-glysidoxypropyltrimethoxysilane (371.6 g) was weighed to a round bottom flask. 28.3 g of water (0.1MHNO3) was added to the reaction flask and the mixture was refluxed at 95° C. for 15 minutes. The reaction mixture was stirred at room temperature for another 18 h. Methacryloxypropyltrimethoxysilane (124.9 g), 1,2-bis(triethoxysilyl)ethane (7.43 g) and 29.4 g of water (0.1 M $HNO_3$) was added to the reaction mixture and the reaction solution was stirred 4 h at room temperature. 10 wt % of Tetraethylene glycol Diacrylate Miramer 270 was added. 200 g of PGME was added to the mixture and volatiles were removed in vacuum. Solid content was adjusted to 40% by adding PGME.

Example 35

Solution 1. Material example 20 found in WO2016/146897: Titanium isopropoxide (40.00 g), Ethyl Acetoacetate (36 g) and Isopropanol (200 g) were weighted into the 500 ml flask and stirred for 1 hour. Phenyltrimethoxysilane (2 g) and methyltrimethoxysilane (5 g) and Isopropanol (50 g) were weighted in 250 ml flask and stirred for 45 min. The prepared two solutions were mixed and stirred overnight with presence of $HNO_3$ (9 g). Solvent exchange was done to propylene glycol ethyl ether (PGEE). Material was diluted to process formulation and filtrated with 0.1 μm filter to obtain process ready solution.

Solution 2. Triethoxysilylpropylmethacrylate (281.88 g) in 2-propanol (131 g), was mixed with 1% NaOH (50.21 g). The solution was stirred at room temperature for over a night. After overnight stirring, mixture was solvent exchanged to 1-methoxy-2-propanol, and solvent solid content was adjusted to 56.5%-57.5%.

Solution 3. Phenyltrimethoxysilane (542 g) was added to the round bottom flask and 147 g of water (0.01M HNO3) was added. Solution was stirred at room temperature for 16 hours. After overnight stirring, mixture was solvent exchanged to 1-methoxy-2-propanol, and solvent solid content was adjusted to 56.5%-57.5%.

Intermediate polymeric layer coating formulation preparation: Solution 1 (380 g) and PGME, 2-methoxy-1-propanol, (2517.6 g) were mixed. Solution 2 (31.2 g), and solution 3 (81.6 g) were added dropwise to solution 1. Final mixture was stirred at room temperature over a night. After that the solution was filtrated and ready to be used.

Example 36

Solution 1 of Example 35 (220 g) and Solution 2 of Example 35 (110 g) were combined. To the combined solution, 0.01M HNO3 (33 g), and 1-methoxy-2-propanol (1155 g) were added. Mixture was stirred at room temperature over a night.

Example 37

Ditrimethylolpropyl tetraacrylate (200 g) was added to the reaction flask, 2-propanol (96 g) and 30.88 g water (0.01M HNO3) were added. Solution was stirred at room temperature for 16 hours.

Example 38

Depending on the deposition technique in use, different solvent types or solvent mixtures can be used in the final material formulation, although often a single solvent is working well. Prior to use, individual materials produced in above Examples 1-27 were diluted to a solid matter content of 40% by adding PGME. UV-initiator UV-6976 in amount of 1 wt % of solid matter was added for creating a species that can initiate the polymerization in the UV curing step in the following comparative examples. 1 wt % of BYK333 was added as leveling agent to the individual materials of Examples 1-30 to form a smooth and uniform coating. The material was deposited on the plastic substrate such that the tested dry film thicknesses were between 5-15 μm, the film thicknesses in the following comparative examples in Table 1 being 6-7 μm. The deposited coating was cured in combination of thermal and UV curing. The thermal curing oven was convection oven.

Example 39

The comparative examples in Table 1 compare the different performance of the coatings formulated according to Example 38 and deposited and cured to 6-7 μm film on 125 μm thick PET. The material coating was tested for pencil hardness according to ASTM D3363-00 pencil hardness test. The same coatings were tested for adhesion according to ASTM D3359-09 cross-hatch tester. Flexibility tests were performed by folding tests using an Elcometer 1500 Cylindrical Mandrel to determine elasticity. Coated sheets were bent around mandrels according to FIG. 2, with mandrels of decreasing diameter until cracks appear. Environmental testing was performed in a humidity chamber in 65° C./65% relative humidity for 2 weeks. The coating is considered pass when no cracks appear in the coating.

As shown in Table 1, there are coatings from Examples 1-30 formulated according to Example 38 and deposited and cured into films of dry thickness of 6-7 μm on PET, which have good hard coat properties and adhesion to PET, PEHA being ≥4H but which results in high folding diameter i.e. the coating not being extremely flexible/bendable, as Example 1 in Table 1. On the other hand, for instance Example 13 formulated according to Example 38 and deposited and cured into films of dry thickness of 6-7 μm on PET, are very flexible as they pass the outfolding and infolding of 0.2 cm diameter mandrel without any cracks. In those examples, on the other hand, the hard-coat properties are rather low, i.e. PEHA is F as shown in Table 1.

Moreover, there are several examples in Table 1 formulated according to Example 38 and deposited and cured into films of dry thickness of 6-7 on PET, which are flexible, have good adhesion to PET, withstand environmental testing, and which have PEHA (pencil hardness) on the level of 3H-4H and have abrasion resistance passing Taber Abrader test 2000 cycles (500 gram weight; #0000 steel wool, 60c/sec; 2.0 inch stroke length; 2×2 cm abrader head), such as Examples 15, 18, 19, 23 and 31.

In Table 1 also the current state of commercial hard-coatings on PET are shown, the pencil hardness being 3H whereas the coatings are not generally extremely flexible, hard coating outfolding diameter being ≥1.2 cm and have very poor abrasion resistance as shown later in further comparison tests reported in Table 2.

TABLE 1

Mechanical properties of coatings in Examples 1-30 and 43-46 formulated according to Example 38 and deposited and cured into films of dry thickness of 6-7 μm on a PET film

| Example | Bendability Mandrel outfolding Ø (cm) pass | Bendability Mandrel infolding Ø (cm) pass | PEHA | ADHE-SION | Thermal/Humidity Stability 65° C. at 65% RH |
|---|---|---|---|---|---|
| Example 6 | 1 | <0.2 | 2H | 3B | Pass |
| Example 1 | 1 | <0.2 | 4H | 3B | Pass |
| Example 27 | 1 | <0.2 | 4H | 4B | Pass |
| Example 23 | 0.8 | <0.2 | 4H | 5B | Pass |
| Example 25 | 0.8 | <0.2 | 3H | 5B | Pass |
| Example 26 | 0.8 | <0.2 | 2H | 4B | Pass |
| Example 30 | 0.8 | <0.2 | 2H | 4B | Pass |
| Example 31 | 0.8 | <0.2 | 4H | 5B | Pass |
| Example 29 | 0.8 | <0.2 | 3H | 4B | Pass |
| Example 11 | 0.6 | <0.2 | 2H | 4B | Pass |
| Example 14 | 0.6 | <0.2 | 3H | 3B | Pass |
| Example 24 | 0.6 | <0.2 | 3H | 4B | Pass |
| Example 16 | 0.5 | <0.2 | H | 5B | Pass |
| Example 18 | 0.5 | <0.2 | 3H | 5B | Pass |

TABLE 1-continued

Mechanical properties of coatings in Examples 1-30 and 43-46 formulated according to Example 38 and deposited and cured into films of dry thickness of 6-7 µm on a PET film

| Example | Bendability Mandrel outfolding Ø (cm) pass | Bendability Mandrel infolding Ø (cm) pass | PEHA | ADHE-SION | Thermal/ Humidity Stability 65° C. at 65% RH |
|---|---|---|---|---|---|
| Example 19 | 0.5 | <0.2 | 3H | 5B | Pass |
| Example 20 | 0.5 | <0.2 | 2H | 5B | Pass |
| Example 21 | 0.5 | <0.2 | 3H | 5B | Pass |
| Example 22 | 0.5 | <0.2 | 3H | 5B | Pass |
| Example 52 | 0.5 | <0.2 | 3H | 5B | Pass |
| Example 15 | 0.4 | <0.2 | 3H | 5B | Pass |
| Example 17 | 0.4 | <0.2 | 2H | 4B | Pass |
| Example 51 | 0.4 | <0.2 | 3H | 5B | Pass |
| Example 50 | 0.4 | <0.2 | 3H | 5B | Pass |
| Example 53 | 0.3 | <0.2 | 2H | 5B | Pass |
| Example 13 | <0.2 | <0.2 | F | 5B | Pass |
| Commercial coating 1 | 1.2 | <0.2 | 3H | 5B | Pass |

Example 40

The solutions in the above examples can be applied in large scale as a single-layer coating using roll-to-roll (R2R) processes or sheet coating (e.g. slot coating, roller, spray, ink-jet) process followed by thermal and UV curing steps. Especially R2R processing is beneficial as this technique can reduce manufacturing costs due to high production rates and yields, enabling manufacturing in mass quantities. Roll coating can be characterized by at least two rollers in a large variety of configurations being used to deliver a thin layer of liquid (various deposition methods are being used including mayer bar/rod method, slot-die method, reverse gravure, gravure etc.) from a bath and apply it to plastic film surface (PET, PMMA, PC, PEN, Polyimide, etc). Due to rolling nature of the process with web tension, also the coating applicable to R2R manufacturing must be flexible. In addition to flexibility, the hard-coat material coated in R2R environment should cure fast.

Composite from flexible hard coat Example 28 was diluted to a solid matter content of 30% using PGME:PGMEA (methoxypropanol:PGMEA) solution containing said components at a ratio of PGME:PGMEA=1:1 and another mixture of a solid matter content of 30% using MIBK:PGMEA (MIBK:PGMEA) solution containing said components at a ratio of PGME:PGMEA=1:1. UV initiator Irgacure PAG-290 was used in amount of 1 wt % of solid matter together with 0.25 wt % of solid matter UV sensitizer UVS-1331, with BYK-333 added in amount of 1 wt % of solid matter as leveling agent. The R2R test runs were done both with slot-die and mayer rod coating methods on PET. The ovens had in-line hot air blowers, temperature being 150° C. With web speed of 5 m/min, UV unit 30% power and film thickness of 5 µm the film quality and properties were similar to those in laboratory conditions.

Composite from flexible hard coat Example 15 was diluted to a solid matter content of 40% using PGME. UV initiator UVI-6976 was used in amount of 1 wt % of solid matter, BYK-333 added in amount of 1 wt % of solid matter as leveling agent. The R2R test runs were done with reverse gravure and meyer rod coating methods on PET. The ovens had in-line hot air blowers, temperature being 120° C. With web speed of 3 m/min and 5 m/min, UV unit 30-33% power and film thickness of 7 µm the film quality and properties were similar to those in laboratory conditions.

Composite from flexible hard coat Example 32 was coated in R2R facility in meyer rod coating method on PET. The ovens had blowers, temperature being 120° C. With web speed of 5 m/min, UV unit 33% power and film thickness of 5.5 µm the film quality and properties were similar to those in laboratory conditions.

Scale up composite from low iridescence primer in Example 35 was coated in R2R facility in meyer rod coating method and reverse gravure coating method on PET. Further, a double layer coating was tested on top of this example. Scale up composite from flexible hard coat Example 15 was diluted to a solid matter content of 40% using PGME. UV initiator UVI-6976 was used in amount of 1 wt % of solid matter, BYK-333 added in amount of 1 wt % of solid matter as leveling agent. The R2R test runs were done with reverse meyer rod coating method. The ovens had in-line hot air blowers, temperature being 120° C. The double-layer low iridescence hard-coat stack had similar properties to those achieved in laboratory scale.

Example 41

In many flexible hard-coatings, it is important that the coatings are easy to clean i.e the coating after curing has a high water contact angle, preferably over 90° C., preventing dirt to accumulate on the surface. Moreover, it is important for the coatings to be durable, retaining the easy-to-clean properties. Generally the simultaneous realization of the benefits of both flexible and wear resistant materials is difficult to achieve. For many anti-fingerprint and/or easy-to-clean coatings in the market, the so called easy-to-clean properties are quickly worn off from the coated surface. Some of the Examples 1-32 formulated according to Example 38 and deposited as a film poses superior durability of the easy-to-clean coating properties. A comparison between the easy-to-clean properties of Examples 1-32 as coating are shown in Table 2, together with a commercially available flexible hard-coatings on PET. The commercially available coatings are the same as reported in Table 1.

Abrasion and Scratch Testing

Taber linear abrasion test (Using Linear Abraser from Taber Industries) was carried out up to 2000 linear cycles: BonStar steel wool #0000, 500 g weight, 2×2 cm head size, 2.0 inch stroke length, 60c/min.

During the measurement water contact angle was measured at 100 cycle intervals up to 500 cycles. Surface damage/visual scratch abrasion test was done at 100 cycle intervals up to 2000 cycles and inspection done on samples if any visual scratches are being produced during the test by the steel wool abrasion.

The samples presented by the new invention, provide excellent abrasion resistance against surface damage/visual scratches. No visual scratches produced after 2000 cycles of steel wool abrasion. The tested Commercial coating 1 hard coated PET samples show visual scratches after 400 cycles abrasion test with serious scratched produced to the surface of the coated substrate.

TABLE 2

Easy-to-clean properties: Abrasion tests between the
Coatings from Examples 1-32 and commercial coatings 1

| Material | Taber abrasion tests up to 500 linear cycles 12.5 kPa with #0000 Steelwool (Water Contact angle measured before and after steel wool abrasion) | | Taber abrasion tests up to 2000 linear cycles 12.5 kPa with #0000 Steelwool |
|---|---|---|---|
| | Initial CA (0 cycles) | 500 cycles | Surface damage/ visual scratches |
| Commercial coating 1 | 101 | 81 | Visual scratches and serious surface damage at 400 cycles |
| Coating material from Examples 11-15 | 102 | 85 | No damage at 2000 cycles |
| Coating material from Examples 18-24 | 102 | 85 | No damage at 2000 cycles |
| Coating material from example 10 | 106 | 97 | No damage at 2000 cycles |
| Coating material from example 16 | 106 | 91 | No damage at 2000 cycles |
| Coating material from example 17 | 108 | 102 | No damage at 2000 cycles |
| Coating material from example 25 | 104 | 96 | No damage at 2000 cycles |
| Coating material from example 26 | 104 | 92 | No damage at 2000 cycles |
| Coating material from example 29 | 104 | 96 | No damage at 2000 cycles |
| Coating material from example 30 | 102 | 92 | No damage at 2000 cycles |
| Coating material from example 32 | 113 | 106 | No damage at 2000 cycles |

As demonstrated by the examples contained herein it has been found that when producing siloxane polymer coating composition, having bi-silane monomers (0.1-10 mol %) in combination with epoxy based monomer (typically in excess of 20 mol %) as UV curing system, it is possible to produce high surface hardness >3H, to achieve extremely good abrasion resistance (see Table 2) and to retain high flexibility/elasticity (outfolding mandrel diameter test result <0.4 cm).

The excellent properties obtained can be explained by the high elasticity due to nature of the epoxy functionality and very effective UV cure cross linking and surface cure by the epoxy functionality (with epoxy based UV cure system oxygen inhibition is not interfering the UV crosslinking as compared to acrylate based radical cure systems), but this is only one possibility and the present invention is not to be construed to be limited to that explanation.

Furthermore, epoxy functionality properties combined with improved crosslinking and packing of the film by bi-silane further improves the surface hardness properties.

Example 42

The coatings in Table 1 are shown as applied to PET. The siloxane polymers in Examples 1-32 can be applied also on other plastics, such as on PC (polycarbonate) and PMMA. PC has inherently low surface energy and polarizability which makes it more challenging for coatings adhere to PC. Due to PC being chemically inert, it requires surface treatment to increase its adhesion characteristics to other materials without changing its other properties. Gas plasma surface treatment i.e. plasma activation can be used to increase polycarbonate surface energy prior to coating, which helps the coatings to bond with the PC surface. Especially Examples 15, 22, 23, 28 and 31 formulated according to Example 36 and deposited and cured into films of dry thickness of 6-7 µm show good adhesion of 4-5B on PC. From those, all the others except for Example 28 pass the environmental testing.

In addition to plasma activation, adhesion to substrates like PC can be improved by adhesion promoters used as primers to promote adhesion between the surface and the siloxane polymer coating, i.e. the primer having two different reactive groups: one compatible with the substrate and the other compatible with the flexible hard-coating. Usage of primers adds another coating step to the process. In this example, primers 3-(aminopropyl)triethoxysilane and 3-(aminopropyl)-trimethoxysilane were dissolved in 2-propanol 2 wt % solution and deposited and bonded on polycarbonate surface as a thin layer and thermally cured prior to applying the flexible hard-coat layer on the PC surface.

Example 43

UV-initiator UV-6976 in amount of 3 wt % of solid matter was added to a the material from Example 33 and 34 in order to initiate the polymerization in the UV curing step, and 1 wt % of BYK333 was added as leveling agent to form a smooth and uniform coating and good wetting during the coating process. The material was deposited on PMMA substrate such that the tested dry film thicknesses were between 2-11 µm, and the deposited coating was cured in combination of thermal and UV curing. When using formulated material from Example 33 on PMMA, the resulting film hardness of 5H pencil hardness and 4B adhesion were achieved. When using formulated material from example 34 on PMMA, the resulting film hardness of 5H pencil hardness and 5B adhesion.

Example 44

Depending on the deposition technique in use it is preferable to use different solvent types or solvent mixtures as the final material formulation. Often a single solvent is working well, but for example spray coating a dilution to 30% solid material content using PGME:ETOH:EG (2-methoxypropanol:ethanol:ethyleneglycol) solution containing said components at a ratio of PGME:ETOH:EG=70:27:2.5 gives good film forming performance. UV initiator UV-6976 was used in amount of 1 wt % of solid matter with BYK-3700 added in an amount of 1 wt % of solid matter as leveling agent. Another example of spray coating formulation is dilution to 20% solid material content using PGME:ETOH at a ratio of 1:1 for good film forming performance. For that, UV initiator UV-6976 was used in amount of 1 wt % of solid matter with BYK-333 added in amount of 1 wt % of solid matter as leveling agent. These are just given as an example and it is always case by case optimization depending on the material composition and deposition technique used.

Example 45

The optical properties of plastics are improved also with the flexible hard coating applied from Examples 1-32. The optical properties of PET film improve considerably as the transmission gain in 550 nm from blank PET 88.93% to that of coating from Example 15 is 90.41%, i.e 1.48% units. The average gain in 400-700 nm is 1.52% units. Similarly, the haze value improve as blank PET haze value was 0.26 and that with hard coating from Example 15 decreased to 0.19.

Example 46 (cf. the Attached Drawings)

Examples 35, 36 and 37 are examples of the intermediate polymeric solutions designed to virtually eliminate iridescence effect i.e. the rainbow effect which is observed in many plastic films when viewing from certain angles. The low iridescence coatings are highly transparent, optically clear and flexible coatings The optical property improvement is demonstrated in this example and in the following examples 44 and 45. Adjusting the compositional matter of the coating solutions is case specific to achieve required optical, chemical and mechanical performance. It is possible to select and use also other metalloxane monomers (e.g. Zirconium, Aluminum, Tantalum to be used in the compositional matter of examples 35-37), silane monomers and acrylate monomers. In case of double layer stack structure, it is also required to take into account the subsequent layer properties deposited on the intermediate polymeric layer to ensure required performance of the stack.

PGME (904.32 g) was added to the final mixture from Example 35. The material was deposited on the plastic substrate in a dry film thickness of 100 nm, cured thermally at 140° C. in convection oven. The optical properties of PET film improve considerably as the transmission gain in 550 nm is from blank PET 88.93% to that of coating 90.59%, i.e 1.66% units. The average gain in 400-700 nm is 1.38% units.

Example 47

The mixture from Example 36 was diluted with PGME to 2.5% of solid matter content. The material was deposited on the plastic substrate in a dry film thickness of 100 nm, cured thermally at 140° C. in convection oven. The optical properties of PET film improve considerably as the transmission gain in 550 nm is from blank PET 88.93% to that of coating 90.64%, i.e 1.71% units. The average gain in 400-700 nm is 1.41% units.

Example 48

The final coating formulation mixture from Example 35 (161.6 g) was mixed with the solution from Example 37 (90 g). PGME (948.5 g) was added to the solution. The material was deposited on the plastic substrate in a dry film thickness of 100 nm, cured thermally at 140° C. in convection oven. The optical properties of PET film improve considerably as the transmission gain in 550 nm is from blank PET 88.93% to that of coating 91.15%, i.e 2.22% units. The average gain in 400-700 nm is 1.86% units.

Example 49

The optical properties of plastics are improved also with the flexible hard coating applied from Examples 1-32. The optical properties of PET film improve considerably as the transmission gain in 550 nm from blank PET 88.93% to that of coating from Example 15 is 90.41%, i.e 1.48% units. The average gain in 400-700 nm is 1.52% units. Similarly, the haze value improve as blank PET haze value was 0.26 and that with hard coating from example 15 decreased to 0.19.

Further improvements in optical properties can be achieved with double layer coating stack (FIG. 4) where the intermediate polymeric material is first deposited and cured on PET followed by the siloxane polymer coating material deposition and curing (from examples 1-32). When the flexible hard coating from Example 15 is applied according to Example 38 on top of the intermediate polymeric layer on PET from example 48, the optical properties of PET film improve further as the transmission gain in 550 nm is from blank PET 88.93% to that of coating stack in this example was 90.79%, i.e 1.86% units. The average gain in 400-700 nm is 1.75% units. Similarly, the haze value improved even more as blank PET haze value was 0.26 and that with low iridescence coating and hard coating stack is 0.16.

The double layer stack was applied on PET also using R2R processing with scale up composite from Example 35 and formulated according to Example 47. The coating method was reverse gravure. The coating was thermally cured using in-line ovens with blowers, temperature being 120° C. and web speed of 3 m/min. The hard coat was applied on top of the primer layer as described in Example 40. The final double-layer product does not loose the flexible hard coat properties but the iridescence decreases with the double-layer stack compared to flexible hard coating only on PET.

Example 50

3-glysidoxypropyltrimethoxysilane (39.99 g), methacryloxypropyltrimethoxysilane (21.01 g), 1,2-bis(triethoxysilyl)ethane (10 g) and acetone (53.0 g) were weighed to a round bottom flask. 16.75 g of 0.1 M aqueous $HNO_3$ was added and the reaction solution was stirred 20 h at room temperature. Solvent was changed from acetone to PGME (55 g added). Solid content was adjusted to 40%.

Example 51

3-glysidoxypropyltrimethoxysilane (46.66 g), methacryloxypropyltrimethoxysilane (14.01 g), 1,2-bis(triethoxysilyl)ethane (10 g) and acetone (53.25 g) were weighed to a round bottom flask. 16.75 g of 0.1 M aqueous $HNO_3$ was added and the reaction solution was stirred 20 h at room temperature. Solvent was changed from acetone to PGME (45 g added). Solid content was adjusted to 40%.

Example 52

3-glysidoxypropyltrimethoxysilane (40.44 g), methacryloxypropyltrimethoxysilane (13.07 g), 1,2-bis(triethoxysilyl)ethane (14 g) and acetone (50.63 g) were weighed to a round bottom flask. 16.35 g of 0.1 M aqueous $HNO_3$ was added and the reaction solution was stirred 20 h at room temperature. Solvent was changed from acetone to PGME (50 g added). Solid content was adjusted to 40%.

Example 53

3-glysidoxypropyltrimethoxysilane (43.32 g), methacryloxypropyltrimethoxysilane (21.01 g), 1,2-bis(triethoxysilyl)ethane (5 g) and acetone (52.0 g) were weighed to a round bottom flask. 15.99 g of 0.1 M aqueous $HNO_3$ was added and the reaction solution was stirred 20 h at room temperature. Solvent was changed from acetone to PGME (50 g added). Solid content was adjusted to 40%.

Example 54

3-glysidoxypropyltrimethoxysilane (40 g), methacryloxypropyltrimethoxysilane (16.16 g), 1,2-bis(triethoxysilyl)ethane (9.21 g) and acetone (49 g) were weighed to a round bottom flask. 15.45 g of 0.1 M aqueous $HNO_3$ was added and the reaction solution was refluxed at 95° C. for 2 hours. Solvent was exchanged from acetone to PGME (40.03 g). The solution was diluted to a solid matter content of 40% by adding PGME. UV-initiator UV-6976 in amount of 1 wt % of solid matter was added for creating a species that can initiate the polymerization in the UV curing step in the following comparative examples. 1 wt % of BYK333 was added as leveling agent to form a smooth and uniform coating.

2 g of 2,2'-Dihydroxy-4-methoxybenzophenone (UV block) and 10 g of material described above was mixed for 48 h. The material was deposited on the plastic substrate such that the tested dry film thicknesses were between 1.7 to 2.5 µm. The deposited coating was cured in combination of thermal and UV curing. The thermal curing oven was a convection oven.

The material was tested for UV blocking properties.

Material deposition: Coating material is deposited on a substrate by using slot coating, combined slot+spin coating, spin coating, spray coating, ink-jet printing, curtain coating, roller, roll-to-roll, printing (to mention few typical liquid phase deposition methods). The formulation (solvent(s)+ additives) is adjusted the way that a proper coating thickness, uniformity and planarization/conformality (to mention few typical requirements) of the coating are achieved.

Example Process for Coating Deposition and Patterning on a Substrate:

1. Substrate pre-clean (Substrate can contain ITO, metal, glass, black matrix or white matrix or polymer surface exposed to the coating layer): Potassium hydroxide (KOH) pre-clean (the KOH solution can be at room temperature or temperature can be varied between 20° C.-55° C.; typical concentration can be varied from 0.04% to 1%) followed by deionized water rinse followed by a drying process. Alternatively adhesion promoters, primers or other chemical or physical surface modification methods can be used to improve wetting and adhesion.

2. Material deposition: Coating material is deposited on a substrate by using slot coating, combined slot+spin coating, spin coating, spray coating, ink-jet printing, curtain coating, roller, roll-to-roll, printing (to mention few typical liquid phase deposition methods). The formulation (solvent(s)+ additives) is adjusted the way that a proper coating thickness, uniformity and planarization/conformality (to mention few typical requirements) of the coating are achieved.

3. Vacuum dry and/or pre-bake: After deposition the substrate is transferred to a vacuum dry station and/or pre-bake on a hot-plate (or oven) usually at 70-120° C. for 1-3 minutes. In this step major portion of the formulation solvent is removed and substrate is left with a pre cured (dry or slightly tacky) film ready for further processing.

4. Exposure: Exposure can be done for patterned (photolithography) or non-patterned version (normal UV-exposure) of the material. In a standard photolithography process, a photomask or reticle is used with broadband, g-,h-,i-line or i-line exposure. Typical UV exposure dose required is 50-200 mj (or above) by using g-,h-,i-line exposure. In case no patterning is required for the deposited layer or the patterning is done by other means a full substrate area exposure can be used (without using any photomask or reticle). It is also possible to use so called wait step or post exposure bake step to improve exposed region curing. The material described in the current invention functions as a negative tone resist meaning the areas what are exposed polymerize under UV light (making the exposed areas less soluble to a developer). It is possible to reverse the material to be positive tone (making the exposed areas to be more soluble to the developer solution) with special additives. It is also possible to use the material as thermal cure formulation without using the UV-exposure in case no patterning is needed. In this case thermal initiators can be applied.

5. Development: If patterned, then in the development step the more soluble regions of the film (see above) are dissolved by the developer solution. The less soluble regions (exposed areas in case of negative tone material) remain on the substrate after development. So called spray development or a buddle development methods can be used. The developer solvent can be at room temperature or temperature can be varied between 20-55° C. Typical developers include potassium hydroxide (KOH) and tetra methyl ammonium hydroxide (TMAH), but is not limited to these. Typical concentrations are e.g. 0.04%-0.7% for KOH and 0.2%-2.38% for TMAH. The application of the developer solution is followed by a deionized or standard water rinse spray or buddle. As a final step, water is dried off by air knife/blow and/or heating (blow or IR-cure, hot-plate or oven).

6. Final cure: depending on the used substrate and other coating material layers the material is cured in convection oven, by IR-lamp cure, forced air cure at 80-300° C. Also specifically in a cases where the material layer is deposited directly on a substrate, which is already attached to the display substrate the processing temperature is limited to max 150° C. or even to temperatures below 120° C. Typical curing time can be example 30 min at temperature. The material layer composition has to deliver all above properties at the low final cure temperature. The material can be used at higher final cure temperatures (e.g. 200° C. or 230° C. or higher), but it is specifically designed to deliver performance also at the low temperatures.

INDUSTRIAL APPLICABILITY

Generally, the material composition can function as optical and/or hard coating layer(s) or optical or mechanical structure in display devices (such as LCD or OLED display), solar cell, solar module, LED, semiconductor devices or on substrates part of an illumination device, display backlight unit, diffusor film, reflector film and/or light guideplate and on display polarizer substrates or in flexible/printed/foldable/wearable electronics device manufacture and also used in applications/devices such as white goods industry, automotive, packaging, sensors and IOT applications.

It is also possible to use the compositions for making insulating layers on a substrate or in an electronic component. This insulating layer can also function simultaneously as a planarization layer on a substrate or in an electronic device. This substrate and/or electronic device (such as a thin film transistor or sensor or color filter or cover substrate) can be part of a display device (e.g. liquid crystal display or OLED display).

REFERENCE SIGNS LIST

100 Substrate
101 Coating Layer 1
110 Substrate 1
111 Coating Layer 2
120 Substrate 2
121 Coating Layer 3
200 Flexible substrate
210 Coating material
205 Cylindrical mandrel
300 Substrate 310 Material film
320 Plastic element
340 Flexible hard coat
400 Substrate
405 Coating layer or surface treatment
410 Coating

REFERENCE LIST

Patent Literature

JP 2006-063244
US 20120034450
US 20130331476
JP 2017008144

The invention claimed is:

1. A method of producing a layered structure with a substrate layer and an overlapping layer of a siloxane polymer, comprising:
providing a substrate which is flexible, bendable, or both;
depositing on the substrate a composition comprising, in a solvent, at least three different silane monomers, including at least one bi-silane;
at least one of the silane monomers having an active group capable of achieving cross-linking to adjacent siloxane polymer,
said composition having been subjected to at least partial hydrolysis of the silane monomers to form siloxane polymer chains before deposition; and
cross-linking the siloxane polymer chains so as to achieve a cross-linked siloxane polymer layer on the substrate,
wherein the at least three different silane monomers comprise first monomers containing a first active group and second monomers containing a second active group, the first active group being different from the second active group, said first active group being selected from the group consisting of epoxy, vinyl, and allyl groups, and the second active group being selected from the group consisting of acrylate and methacrylate groups,
wherein the molar ratio between the first monomers containing the first active group to the second monomers containing the second active group is from 1:100 to 100:1, and
wherein the molar ratio of Si(OH) groups to Si(total) in the composition is from 25 to 35.

2. The method according to claim 1, further comprising:
pre-curing or drying a siloxane polymer film deposited on the substrate;
exposing the thus obtained film to UV light;
developing the thus obtained film; and
curing the film or structure.

3. The method according to claim 2, wherein the curing is carried out thermal or radiation irradiation or by a combination thereof.

4. The method according to claim 1, comprising depositing on the substrate an at least partially cross-linked siloxane polymer obtained by:
(a) admixing a first solvent(s), at least three different silane monomers, to form a mixture, wherein at least one of the silane monomers includes an active group capable of achieving cross-linking to adjacent siloxane polymer chains upon a thermal or radiation initiation;
(b) subjecting the mixture to an acid treatment so that the silane monomers are at least partially hydrolysed, and the hydrolysed silane monomers are at least partially polymerized and cross-linked;
(c) optionally changing the first solvent to a second solvent; and
(d) subjecting the mixture to thermal or radiation initiation so that further cross-linking of the siloxane polymer is achieved.

5. The method according to claim 1, wherein the composition is deposited by spin-on, dip, spray, ink-jet, roll-to-roll, gravure, reverse gravure, bar coating, slot, flexo-graphic, curtain, screen printing coating methods, extrusion coating or slit coating.

6. The method according to claim 1, wherein the active group is an epoxy, glycidyl, vinyl, allyl, acrylate, or a methacrylate group, or a combination thereof.

7. The method according to claim 1, further comprising using a thermal initiator for cross-linking the polymer, said thermal initiator being tert-amyl peroxybenzoate, 4,4-azobis (4-cyanovaleric acid), 1, 1'-azobis(cyclohexanecarbonitrile), benzoyl peroxide, 2,2-bis(tert-butylperoxy) butane, 1,1-bis(tert-butylperoxy) cyclohexane, 2,2'-azobisisobutyronitrile (AIBN), 2,5-bis(tert-butylperoxy)-2,5-dimethylhexane, 2,5-bis(tert-Butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, bumene hydroperoxide, byclohexanone peroxide, bicumyl peroxide, lauroyl peroxide, 2,4-pentanedione peroxide, peracetic acid or potassium persulfate.

8. The method according to claim 7, wherein the thermal initiator is AIBN.

9. The method according to claim 1, wherein the cross-linking is done at a temperature in the range of about 30 to 200° C.

10. The method according to claim 1, wherein an epoxy-functional group containing monomer is selected, and wherein the epoxy-functional group containing monomer is selected from the group consisting of (3-glycidoxypropyl) trimethoxysilane, 1-(2-(Trimethoxysilyl)ethyl) cyclohexane-3,4-epoxide, (3-glycidoxypropyl)triethoxysilane, (3-glycidoxypropyl)tripropoxysilane, 3-glycidoxypropyltri (2-methoxyethoxy)silane, 2,3-epoxypropyltriethoxysilane, 3,4-epoxybutyltriethoxysilane, 4,5-epoxypentyltriethoxysilane, 5,6-epoxyhexyltriethoxysilane, 5,6-epoxyhexyltrimethoxysilane, 2-(3,4-epoxycyclohexyl)ethyltriethoxysilane, and 2-(3,4-epoxycyclohexyl)ethyltrimethoxysilane, 4-(trimethoxysilyl)butane-1,2-epoxide, and combinations thereof.

11. The method according to claim 1, wherein the molar portion of monomers containing the active group calculated from the total amount of monomers is from about 1 to 95%.

12. The method according to claim 1, wherein the method forms a layer of the siloxane polymer having a thickness of 1 to 50 µm, and said siloxane polymer being capable of being bent about a mandrel having a radius of curvature without breaking.

13. The method according to claim 1, wherein the substrate is capable of being bent about a mandrel having a first minimum radius of curvature without breaking.

14. The method according to claim 13, wherein the substrate is selected from the group consisting of thermoplastic polymers, polyolefins, polyesters, polyamides, polyimides, acrylic polymers, and poly(methylmetharylate).

15. The method according to claim 1, wherein the substrate is capable of being bent about a mandrel having a first minimum radius of curvature without breaking and the layered structure is capable of being bent about a mandrel having a second minimum radius of curvature without breaking, said first minimum radius being smaller or equal to the second minimum radius of curvature.

16. A method of producing a siloxane polymer, comprising:
(a) admixing a first solvent(s), at least three different silane monomers, including at least one bi-silane to form a mixture,
wherein at least one of the silane monomers includes an active group capable of achieving cross-linking to adjacent siloxane polymer chains upon a thermal or radiation initiation, wherein the at least three different silane monomers comprise a first silane selected from the group consisting of methyltriethoxysilane, phenyltrimethoxysilane, 3-methacryloxypropyltrimethoxysilane, diphenylsilanediol, and glycidoxypropyltrimethoxysilane and a second silane, and wherein the second silane is a bi-silane selected from the group consisting of 1,2-bis(triethoxysilyl) ethane, and 1,2-bis(trimethoxysilyl) methane;
(b) subjecting the mixture to an acid treatment so that the silane monomers are at least partially hydrolysed, and the hydrolysed silane monomers are at least partially polymerized and cross-linked;
(c) optionally changing the first solvent to a second solvent; and
(d) subjecting the mixture to conditions conducive to further cross-linking of the siloxane polymer;
said siloxane polymer being capable of forming a layer having a thickness of 1 to 50 μm, which can be bent about a mandrel having a radius of curvature without breaking, as evidenced as a value of less than 0.8 cm, on an outfolding mandrel diameter test,
wherein the molar ratio of Si(OH) groups to Si(total) in the mixture is from 25 to 35.

17. The method of claim 16, wherein the at least three monomers comprise 40 mole-% of 3-glycidoxypropyl) trimethoxysilane and at least 20 mole-% of methacryloxypropyltrimethoxysilane.

18. The method of claim 1, wherein the molar ratio between the first monomers containing the first active group to the second monomers containing the second active group is from 1:10 to 10:1.

19. The method of claim 1, further comprising providing an intermediate layer between the polymer layer and the substrate, wherein the intermediate layer is obtained by combining a metal oxide precursor together with a complexing agent for the metal precursor, and one more silane monomers.

20. The method of claim 1, wherein the substrate is selected from the group consisting of polyolefins, polyesters, polyamides, polyimides and acrylic polymers.

* * * * *